(12) United States Patent
Takeuchi et al.

(10) Patent No.: US 7,943,210 B2
(45) Date of Patent: *May 17, 2011

(54) PHASE DIFFERENCE PLATE COMPRISING POLYMER FILM CONTAINING COMPOUND HAVING ROD-SHAPED MOLECULAR STRUCTURE

(75) Inventors: Hiroshi Takeuchi, Minami-ashigara (JP); Hiroaki Sata, Minami-ashigara (JP); Hiroyuki Kawanishi, Minami-ashigara (JP); Takamichi Fujii, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 12/379,145

(22) Filed: Feb. 13, 2009

(65) Prior Publication Data

US 2009/0163703 A1 Jun. 25, 2009

Related U.S. Application Data

(62) Division of application No. 11/368,633, filed on Mar. 7, 2006, now Pat. No. 7,559,986, which is a division of application No. 10/471,560, filed as application No. PCT/JP02/02411 on Mar. 14, 2002, now Pat. No. 7,060,333.

(30) Foreign Application Priority Data

Mar. 14, 2001 (JP) .................................. 2001-072391
Mar. 14, 2001 (JP) .................................. 2001-072392
Aug. 20, 2001 (JP) .................................. 2001-249273

(51) Int. Cl.
 *C09K 19/00* (2006.01)
(52) U.S. Cl. ....................................................... 428/1.2
(58) Field of Classification Search .................. None
See application file for complete search history.

(56) References Cited

U.S. PATENT DOCUMENTS

| | | | |
|---|---|---|---|
| 5,412,044 A | 5/1995 | Hefner et al. | |
| 5,464,912 A | 11/1995 | Hefner et al. | |
| 5,852,487 A | 12/1998 | Fujimori et al. | |
| 6,020,945 A | 2/2000 | Sawai et al. | |
| 6,362,862 B1 | 3/2002 | Itoh et al. | |
| 6,844,033 B2 | 1/2005 | Shimizu et al. | |
| 7,166,339 B1 | 1/2007 | Mori et al. | |

FOREIGN PATENT DOCUMENTS

| | | |
|---|---|---|
| DE | 19941567 A1 | 4/2000 |
| EP | 982621 A2 | 3/2000 |
| EP | 1 182 470 A1 | 2/2002 |
| JP | 11-080090 A | 3/1999 |
| JP | 2000-056301 A | 2/2000 |
| JP | 2000-111914 A | 4/2000 |
| JP | 2000-112663 | 4/2000 |
| JP | 2000-137116 A | 5/2000 |
| JP | 2000-304932 A | 11/2000 |
| JP | 2001-98086 A | 4/2001 |
| JP | 2001-154018 A | 6/2001 |
| JP | 2001-154194 A | 6/2001 |
| JP | 2002-99388 A | 4/2002 |
| WO | WO 00/65384 A1 | 11/2000 |

OTHER PUBLICATIONS

Shibata et al. JP 03-287564, Dec. 18, 1991, abstract only.*
Search Report Issued in International Application No. PCT/JP02/02411, Jul. 9, 2002.
English language translation of the International Preliminary Examination Report mailed Dec. 17, 2003, in International Application No. PCT/JP02/02411.

* cited by examiner

*Primary Examiner* — Anna Jiang
*Assistant Examiner* — Layla Bland
(74) *Attorney, Agent, or Firm* — Buchanan Ingersoll & Rooney PC

(57) ABSTRACT

A phase difference plate which comprises one sheet of polymer film containing a compound having a rod-shaped molecular structure and exhibiting a maximum absorption wavelength ($\lambda$max) of less than 250 nm in an ultraviolet spectrum of its solution and which exhibits a retardation value as measured at a wavelength of 450 nm (Re450) of 60 to 135 nm and a retardation value as measured at a wavelength of 590 nm (Re590) of 100 to 170 nm, where the relationship: Re590−Re450≧2 nm is satisfied. The phase difference plate functions as a $\lambda$/4 plate.

4 Claims, 3 Drawing Sheets

PHASE DIFFERENCE PLATE COMPRISING POLYMER FILM CONTAINING COMPOUND HAVING ROD-SHAPED MOLECULAR STRUCTURE

CROSS-REFERENCE TO RELATED APPLICATIONS

This application is a divisional of application Ser. No. 11/368,633 filed Mar. 7, 2006, now U.S. Pat. No. 7,559,986, issued Jul. 14, 2009, which is a divisional of application Ser. No. 10/471,560 filed Sep. 12, 2003, now U.S. Pat. No. 7,060,333, issued Jun. 13, 2006; the contents of which are incorporated herein by reference, which was the National Stage of International Application No. PCT/JP02/02411 filed Mar. 14, 2002.

FIELD OF INVENTION

The present invention relates to a phase retarder (phase difference plate) which consists of a polymer film containing a rod-like compound and which functions as a λ/4 plate.

The invention also relates to a phase retarder serving as a λ/2 plate, a circularly polarizing plate comprising the λ/4 plate, a liquid crystal display of reflection type comprising the circularly polarizing plate, a touch panel comprising the λ/4 plate, and a liquid crystal display of reflection type comprising the touch panel.

Further, the invention relates to a cellulose ester film containing the rod-like compound.

BACKGROUND OF INVENTION

A λ/4 plate and a λ/2 plate have many uses in relation to anti-reflection films and liquid crystal displays, and hence have been widely and practically used. However, in spite of the name of λ/4 or λ/2, most λ/4 or λ/2 plates give λ/4 or λ/2 at particular wavelengths, respectively.

Japanese Patent Provisional Publication Nos. 5 (1993)-27118 and 5 (1993)-27119 disclose a phase-retarder in which a birefringencial film giving high retardation and another birefringencial film giving low retardation are laminated so that their optical axes may be perpendicularly crossed. If the retardation difference of those films is kept λ/4 in the whole visible wavelength region, the phase-retarder theoretically gives λ/4 in the whole visible wavelength region.

Japanese Patent Provisional Publication No. 10 (1998)-68816 discloses a λ/4 plate giving λ/4 in a wide wavelength region. The disclosed λ/4 plate comprises laminated two films made of the same polymer, and one of the films gives λ/4 and the other gives λ/2 at the same wavelength.

Japanese Patent Provisional Publication No. 10 (1998)-90521 also describes another wide-ranging λ/4 plate comprising laminated two polymer films.

As the polymer films used in the above λ/4 plates, stretched films of synthetic polymer such as polycarbonate are used.

Japanese Patent Provisional Publication No. 2000-137116 discloses still another λ/4 plate comprising a stretched cellulose ester film for giving λ/4 in a wide wavelength region.

International Patent WO00/65384 discloses yet another λ/4 plate comprising a cellulose ester film in which an aromatic compound (retardation-increasing agent) is incorporated so as to give λ/4 in a wide wavelength region.

SUMMARY OF INVENTION

In the case where a cellulose ester film is stretched to obtain an aimed optical character (e.g., λ/4), it is sometimes necessary to stretch the film almost to be torn up.

On the other hand, if the retardation-increasing agent is used, the resultant film is liable to give a retardation value deviating from the aimed value in a short wavelength region.

It is an object of the present invention to improve a phase retarder so that it can give λ/4 or λ/2 in a wide wavelength region.

It is another object of the invention to obtain circularly polarized light in a wide wavelength region.

It is a further object of the invention to improve qualities of an image displayed on a touch panel.

It is a furthermore object of the invention to improve qualities of an image displayed on a liquid crystal display of reflection type comprising a circularly polarizing plate or a touch panel.

It is still further object of the invention to improve durability of a cellulose ester film used in a phase retarder.

The present invention provides a phase retarder consisting of a single polymer film which contains a rod-like compound exhibiting a maximum absorption wavelength (λmax) of shorter than 250 nm in an ultraviolet absorption spectrum of its solution and which has retardation values Re450 and Re590 measured at 450 nm and 590 nm in the ranges of 60 to 135 nm and 100 to 170 nm, respectively; said Re450 and Re590 satisfying the condition of Re590−Re450≧2 nm.

The invention also provides a phase retarder consisting of a single polymer film which contains a rod-like compound exhibiting a maximum absorption wavelength (λmax) of shorter than 250 nm in an ultraviolet absorption spectrum of its solution and which has retardation values Re450 and Re590 measured at 450 nm and 590 nm in the ranges of 120 to 270 nm and 200 to 340 nm, respectively; said Re450 and Re590 satisfying the condition of Re590−Re450≧2 nm.

The invention further provides a circularly polarizing plate comprising a phase retarder and a polarizing membrane laminated thereon so that the polarizing axis of the polarizing membrane is placed essentially at the angle of 45° to the slow axis in the plane of the retarder; said phase retarder consisting of a single polymer film which contains a rod-like compound exhibiting a maximum absorption peak at a wavelength (λmax) shorter than 250 nm in an ultraviolet absorption spectrum of its solution and which has retardation values Re450 and Re590 measured at 450 nm and 590 nm in the ranges of 60 to 135 nm and 100 to 170 nm, respectively; said Re450 and Re590 satisfying the condition of Re590−Re450≧2 nm.

The invention furthermore provides a touch panel comprising face-to-face placed two transparent electrically conductive substrates each of which has a transparent electrically conductive membrane on at least one surface, said substrates being placed so that their conductive membranes may face to each other, at least one of said substrates being a λ/4 plate or being laminated on a λ/4 plate, said λ/4 plate consisting of a single polymer film which contains a rod-like compound exhibiting a maximum absorption peak at a wavelength (λmax) shorter than 250 nm in an ultraviolet absorption spectrum of its solution and which has retardation values Re450 and Re590 measured at 450 nm and 590 nm in the ranges of 60 to 135 nm and 100 to 170 nm, respectively; and said Re450 and Re590 satisfying the condition of Re590−Re450≧2 nm.

The invention still further provides a cellulose ester film containing a compound represented by the following formula (II):

$$Ar^1\text{-}L^2\text{-}X\text{-}L^3\text{-}Ar^2 \qquad (II)$$

[in which each of $Ar^1$ and $Ar^2$ is independently an aromatic group; each of $L^2$ and $L^3$ is independently a divalent linking group selected from the group consisting of an alkylene group, —O—, —CO— and combinations thereof; and X is 1,4-cyclohexylene, vinylene or ethynylene].

The inventors have studied and found that the retardation of the polymer film in a short wavelength region can be properly controlled by adding a retardation-increasing agent of a rod-like compound exhibiting a maximum absorption peak at a wavelength (λmax) shorter than 250 nm in an ultraviolet absorption spectrum of its solution. As a result, the inventors have succeeded in providing a durable phase retarder consisting a single polymer film giving λ/4 or λ/2 in a wide wavelength region.

The λ/4 plate comprising a single polymer film is particularly preferably used in a circularly polarizing plate, a touch panel, and a liquid crystal display of reflection type comprising a circularly polarizing plate or a touch panel.

DETAILED DESCRIPTION OF INVENTION

Retardation of Polymer Film

Figure 1:
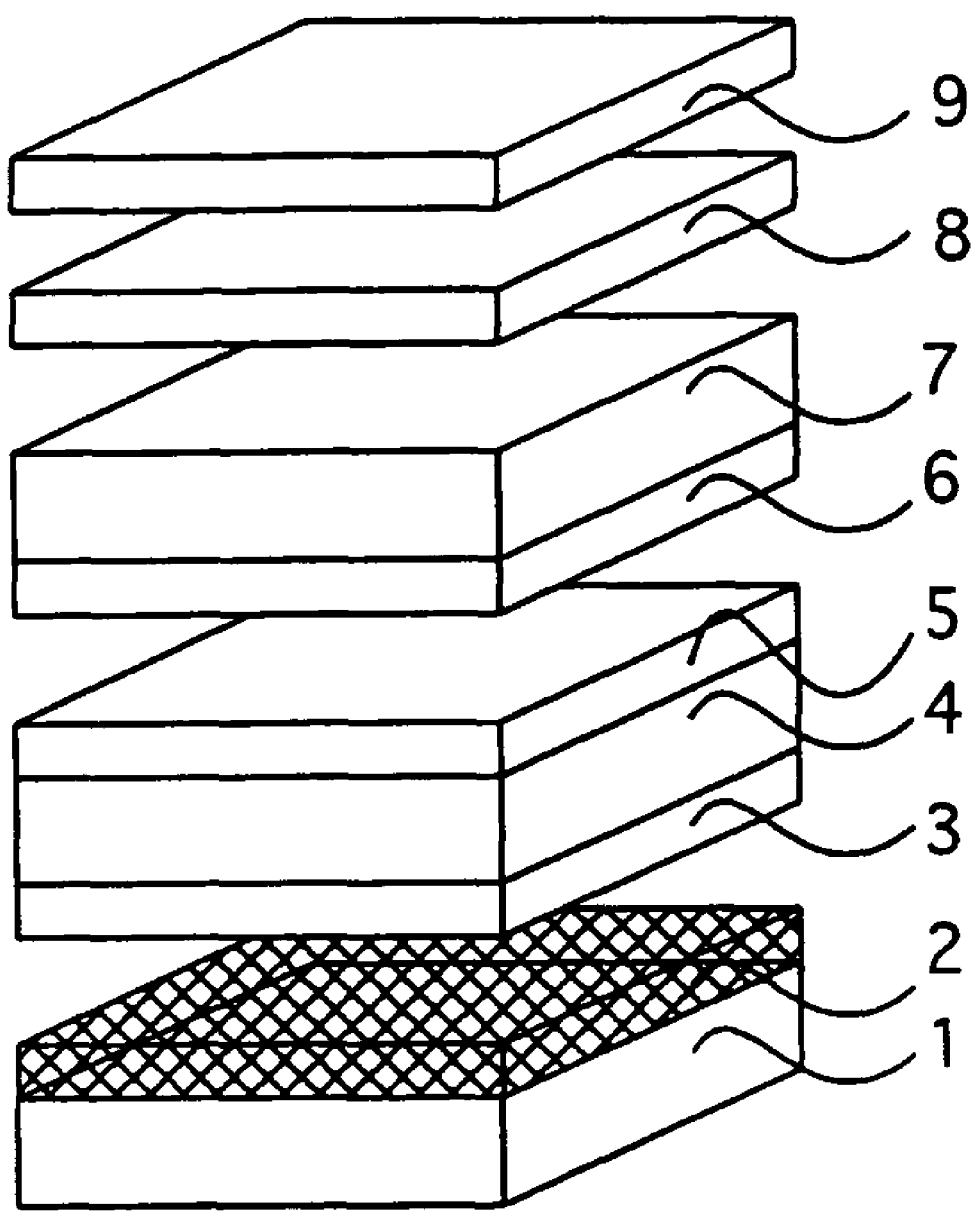
FIG. 1 schematically shows a basic structure of liquid crystal display of reflection type comprising a circularly polarizing plate.

In the case where the polymer film is used as a λ/4 plate, the retardation value measured at 450 nm (Re450) is in the range of 60 to 135 nm and that measured at 590 nm (Re590) is in the range of 100 to 170 nm. The Re450 and the Re590 satisfy the condition of Re590−Re450≧2 nm, preferably Re590−Re450≧5 nm, more preferably Re590−Re450≧10 nm. Preferably, the polymer film has a retardation value measured at 450 nm (Re450) in the range of 108 to 120 nm, another retardation value measured at 550 nm (Re550) in the range of 125 to 142 nm, and yet another retardation value measured at 590 nm (Re590) in the range of 130 to 152 nm. They preferably satisfy the condition of Re590−Re550≧2 nm, more preferably Re590−Re550≧5 nm, most preferably Re590−Re550≧10 nm. It is also preferred to satisfy the condition of Re550−Re450≧10 nm.

In the case where the polymer film is used as a λ/2 plate, the retardation value measured at 450 nm (Re450) is in the range of 120 to 270 nm and that measured at 590 nm (Re590) is in the range of 200 to 340 nm. The Re450 and the Re590 satisfy the condition of Re590−Re450≧4 nm, preferably Re590−Re450≧10 nm, more preferably Re590−Re450≧20 nm. Preferably, the polymer film has a retardation value measured at 450 nm (Re450) in the range of 216 to 240 nm, another retardation value measured at 550 nm (Re550) in the range of 250 to 284 nm, and yet another retardation value measured at 590 nm (Re590) in the range of 260 to 304 nm. They preferably satisfy the condition of Re590−Re550≧4 nm, more preferably Re590−Re550≧10 nm, most preferably Re590−Re550≧20 nm. It is also preferred to satisfy the condition of Re550−Re450≧20 nm.

The retardation value (Re) is defined by the formula:

$$Re=(nx-ny)\times d$$

in which nx is a refractive index along the slow axis (maximum refractive index) in the plane of the retarder; ny is a refractive index in the direction perpendicular to the slow axis in the plane of the retarder; and d is the thickness of the retarder in terms of nm.

The polymer film used the invention is a single film satisfying the condition of:

$$1\leq (nx-nz)/(nx-ny)\leq 2$$

in which nx is a refractive index along the slow axis in the plane of the retarder, ny is a refractive index in the direction perpendicular to the slow axis in the plane of the retarder, and nz is a refractive index along the thickness of the retarder.

The polymer film having the aforementioned optical characters can be prepared from the following materials in the manner described below.

(Polymer for Film)

The polymer film is preferably made of a polymer having a light-transmittance of 80% or more. Examples of the polymer include cellulose esters (e.g., cellulose acetate, cellulose diacetate), norbornene-based polymers, and polymethylmethacrylate. Commercially available polymers such as Artone and Zeonex (norbornene-based polymers) may be used. Cellulose esters are preferred, and cellulose esters of lower fatty acids are more preferred. Here, the term "lower fatty acids" means fatty acids having 6 or less carbon atoms. The number of carbon atoms is preferably 2 (cellulose acetate), 3 (cellulose propionate) or 4 (cellulose butyrate). Cellulose acetate is particularly preferred. Cellulose esters of mixed fatty acids such as cellulose acetatepropionate and cellulose acetate butyrate are also usable.

In addition, polymers that are originally liable to show birefringence (e.g., polycarbonate, polysulfone) can be used if they are modified so as not to show the birefringence in the manner described in WO00/26705.

As the polymer for the film, preferred is a cellulose acetate having an acetic acid content in the range of 55.0 to 62.5%, more preferably in the range of 57.0 to 62.0%.

The term "acetic acid content" means the amount of combined acetic acid per one unit weight of cellulose. The acetic acid content can be determined according to ASTM: D-817-91 (tests of cellulose acetate).

The cellulose ester has a viscosity average polymerization degree (DP) of preferably 250 or more, more preferably 290 or more.

Further, it is also preferred for the cellulose ester used in the invention to have a narrow molecular weight distribution of Mw/Mn (Mw and Mn are weight and number average molecular weights, respectively), which is determined by gel permeation chromatography. The value of Mw/Mn is preferably in the range of 1.0 to 1.7, more preferably in the range of 1.3 to 1.65, most preferably in the range of 1.4 to 1.6.

Generally in a cellulose ester, hydroxyl groups at 2-, 3- and 6-position of cellulose unit are not equally substituted (namely, the substitution degree at each position is not equal to one third of the total substitution degree), and the substitution degree at 6-position is apt to be relatively small. In the cellulose ester used in the invention, however, the substitution degree at 6-position is preferably not smaller than those at 2- and 3-positions.

The hydroxyl group at 6-position is substituted in an amount of preferably 30% to 40%, more preferably 31% or more, most preferably 32% or more, based on the total substitution degree at 2-, 3- and 6-positions. Further, the substitution degree at 6-position is preferably 0.88 or more.

The hydroxyl group at 6-position may be replaced with acyl group other than acetyl. Examples of the other acyl group are acyl groups having 3 or more carbon atoms (e.g., propionyl, butyloyl, valeroyl, benzoyl, acryloyl). The substitution degree at each position can be measured by means of NMR.

The cellulose ester having a high substitution degree at 6-position can be prepared according to the methods described in Japanese Patent Provisional Publication No. 11 (1999)-5851 (Synthesis example 1 in paragraph numbers 0043 to 0044, Synthesis example 2 in paragraph numbers 0048 to 0049, and Synthesis example 3 in paragraph numbers 0051 to 0052).

(Retardation-Increasing Agent)

In the invention, a rod-like compound exhibiting a maximum absorption peak at a wavelength ($\lambda$max) shorter than 250 nm in an ultraviolet absorption spectrum of its solution is used as a retardation-increasing agent.

The rod-like compound has preferably at least one aromatic ring, more preferably at least two aromatic rings in its molecular structure, in consideration of the retardation-increasing function.

Further, the rod-like compound preferably has a linear molecular structure. In other words, it is preferred for the molecule of the compound to be thermally the most stable when it takes a linear posture. What molecular structure is thermally the most stable can be calculated according to the crystal structure analysis or the molecular orbital method. For example, the molecular structure giving the smallest heat of formation can be obtained by calculation according to a molecular orbital calculation program (e.g., WinMOPAC200, Fujitsu Ltd.). The term "linear molecular structure" means that the thermo-dynamically most stable molecular structure calculated above has a bending angle of 140° or more even if it is bent.

The rod-like compound preferably behaves as liquid crystal. It is more preferred to behave as liquid crystal when heated (namely, thermotropic liquid crystal). The liquid crystal phase is preferably nematic phase or smectic phase.

The rod-like compound is preferably represented by the following formula (I):

$$Ar^1\text{-}L^1\text{-}Ar^2 \qquad (I)$$

In the formula (I), each of $Ar^1$ and $Ar^2$ is independently an aromatic group.

The term "an aromatic group" in the specification means an aryl (aromatic hydrocarbon) group, a substituted aryl group, an aromatic heterocyclic group or a substituted aromatic heterocyclic group.

An aryl group and a substituted aryl group are preferred to an aromatic heterocyclic group and a substituted aromatic heterocyclic group. The heterocyclic ring in the aromatic heterocyclic ring is generally unsaturated. The aromatic heterocyclic group preferably comprises a five-, six- or seven- (more preferably five- or six-) membered ring. The aromatic heterocyclic ring generally has double bonds as many as possible. The hetero-atom in the heterocyclic group is preferably nitrogen, oxygen or sulfur atom, more preferably nitrogen or sulfur atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

Examples of the aromatic ring in the aromatic group include benzene ring, furan ring, thiophene ring, pyrrole ring, oxazole ring, thiazole ring, imidazole ring, triazole ring, pyridine ring, pyrimidine ring and pyrazine ring. Benzene ring is particularly preferred.

Examples of the substituent group of the substituted aryl or substituted aromatic heterocyclic group include a halogen atom (F, Cl, Br, I), hydroxyl, carboxyl, cyano, amino, an alkylamino group (e.g., methylamino, ethylamino, butylamino, dimethylamino), nitro, sulfo, carbamoyl, an alkylcarbamoyl group (e.g., N-methylcarbamoyl, N-ethylcarbamoyl, N,N-dimethylcarbamoyl), sulfamoyl, an alkylsulfamoyl group (e.g., N-methylsulfamoyl, N-ethylsulfamoyl, N,N-dimethylsulfamoyl), ureido, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, t-amyl, cyclohexyl, cyclopentyl), an alkenyl group (e.g., vinyl, allyl. hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, oxtyloxy), an aryloxy group (e.g., phenoxy), an alkoxycarbonyl group (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentyl-sulfonyl, heptylsulfonyl, octylsulfonyl), an amido group (e.g., acetamido, butylamido, hexylamido, laurylamido), and a non-aromatic heterocyclic group (e.g., morpholino, pyrazinyl).

Preferred substituent groups of the substituted aryl or substituted aromatic heterocyclic group are a halogen atom, cyano, carboxyl, hydroxyl, amino, an alkyl-substituted amino group, an acyl group, an acyloxy group, an amido group, an alkoxycarbonyl group, an alkoxy group, an alkylthio group and an alkyl group.

The alkyl group and the alkyl moiety of the alkylamino group, the alkoxycarbonyl group, the alkoxy group or the alkylthio group may further have a substituent group. Examples of the substituent group of the alkyl group or moiety include a halogen atom, hydroxyl, carboxyl, cyano, amino, an alkylamino group, nitro, sulfo, carbamoyl, an alkylcarbamoyl group, sulfamoyl, an alkylsulfamoyl group, ureido, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group, and a non-aromatic heterocyclic group. Preferred substituent groups of the alkyl group or moiety are a halogen atom, hydroxyl, amino, an alkylamino group, an acyl group, an acyloxy group, an acylamino group, an alkoxycarbonyl group, and an alkoxy group.

In the formula (I), $L^1$ is a divalent linking group selected from the group consisting of an alkylene group, an alkenylene group, an alkynylene group, a divalent saturated heterocyclic group, —O—, —CO— and combinations thereof.

The alkylene group may have a cyclic structure. As the cyclic alkylene group, cyclohexylene is preferred and 1,4-cyclohexylene is particularly preferred. If the alkylene group has a chain structure, a straight chain structure is preferred to a branched one.

The alkylene group has preferably 1 to 20 carbon atoms, more preferably 1 to 15 carbon atoms, further preferably 1 to 10 carbon atoms, furthermore preferably 1 to 8 carbon atoms, most preferably 1 to 6 carbon atoms.

The alkenylene group or the alkynylene group preferably has a chain structure, more preferably a straight chain structure.

The alkenylene group or the alkynylene group has preferably 2 to 10 carbon atoms, more preferably 2 to 8 carbon atoms, further preferably 2 to 6 carbon atoms, furthermore preferably 2 to 4 carbon atoms, most preferably 2 carbon atoms (namely, the alkenylene group or the alkynylene group is most preferably vinylene or ethynylene, respectively).

The divalent saturated heterocyclic group preferably has a 3- to 9-membered heterocyclic ring. The hetero-atom in the heterocyclic group is preferably oxygen, nitrogen, boron, sulfur, silicon, phosphorus or germanium atom. Examples of the saturated heterocyclic ring include piperidine ring, piperadine ring, morphorine ring, pyrrolidine ring, imidazoline ring, tetrahydrofuran ring, tetrahydropyran ring, 1,3-dioxane ring, 1,4-dioxane ring, tetrahydrothiophene ring, 1,3-thiazolidine ring, 1,3-oxazolidine ring, 1,3-dioxolan ring, 1,3-dithiolan ring and 1,3,2-dioxaborane. Particularly preferred divalent saturated heterocyclic groups are piperadine-1,4-diylene, 1,3-dioxane-2,5-diylene and 1,3,2-dioxaborane-2,5-diylene.

Examples of the combined divalent linking group are shown below.
L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-divalent saturated heterocyclic group-CO—O—
L-8: —CO—O-divalent saturated heterocyclic group-O—CO—

In the molecular structure represented by the formula (I), the angle between $Ar^1$-$L^1$ and $L^1$-$Ar^2$ is 140° or more.

The rod-like compound is more preferably represented by the following formula (II):

$$Ar^1\text{-}L^2\text{-}X\text{-}L^3\text{-}Ar^2. \quad (II)$$

In the formula (II), each of $Ar^1$ and $Ar^2$ is independently an aromatic group. The definition and examples of the aromatic group are the same as those of $Ar^1$ and $Ar^2$ in the formula (I).

In the formula (II), each of $L^2$ and $L^3$ is independently a divalent linking group selected from the group consisting of an alkylene group, —O—, —CO— and combinations thereof.

The alkylene group preferably has a chain structure, and a straight chain structure is preferred to a branched one.

The alkylene group has preferably 1 to 10 carbon atoms, more preferably 1 to 8 carbon atoms, further preferably 1 to 6 carbon atoms, furthermore preferably 1 to 4 carbon atoms, most preferably 1 to 2 carbon atoms (namely, the alkylene group is most preferably methylene or ethylene).

Each of $L^2$ and $L^3$ is particularly preferably —CO— or —CO—O—.

In the formula (II), X is 1,4-cyclohexylene, vinylene or ethynylene.

Examples of the compound represented by the formula (I) are as follows.

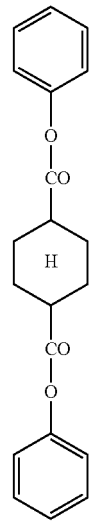

(1)

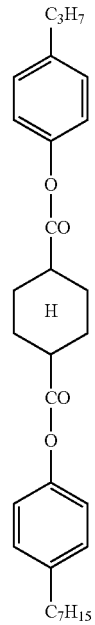

(2)

(3)
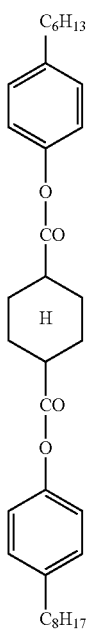
(5)
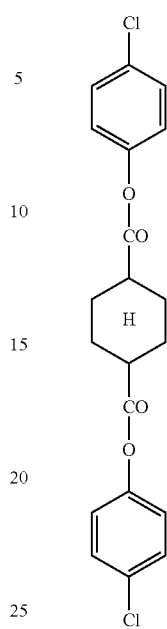
(4)
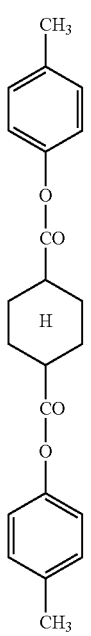
(6)
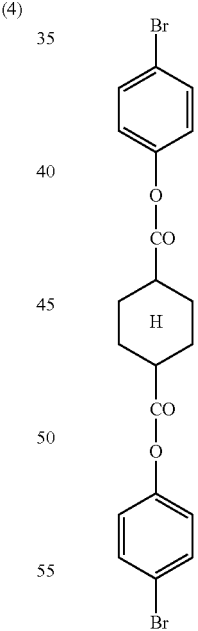

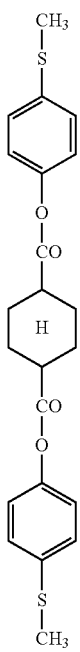 (7)
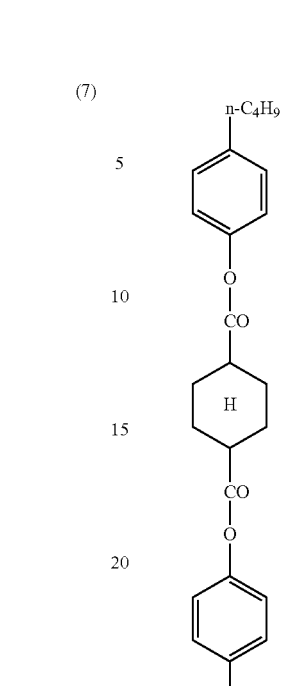 (9)
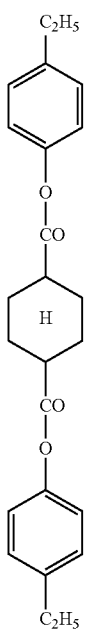 (8)
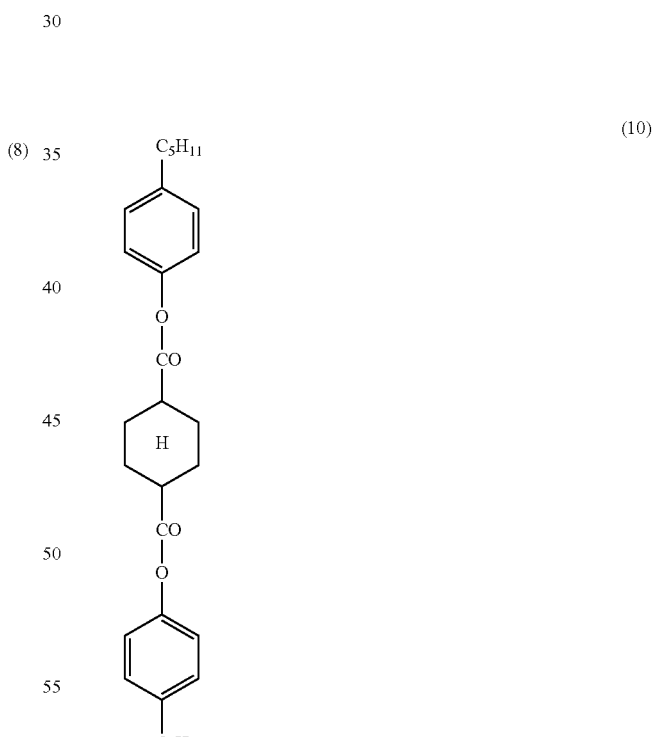 (10)

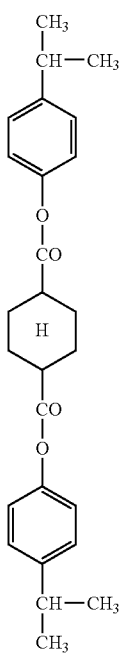 (11)
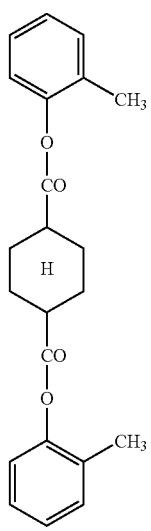 (13)
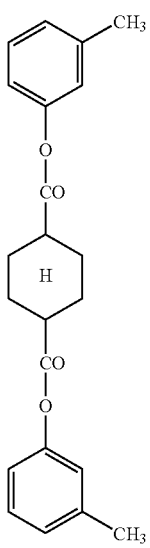 (12)
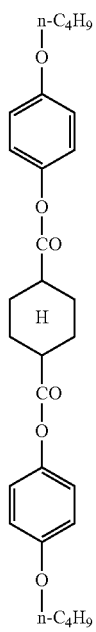 (14)

(15)
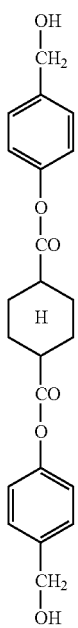
(16)
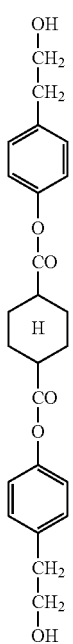
(17)
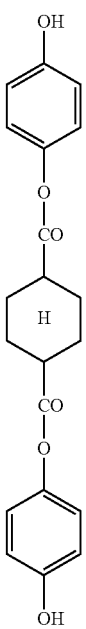
(18)
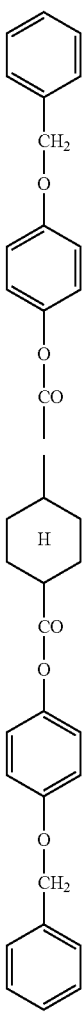

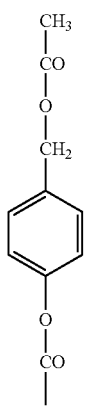
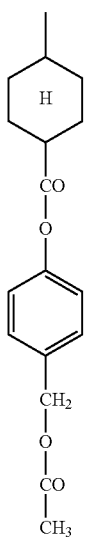
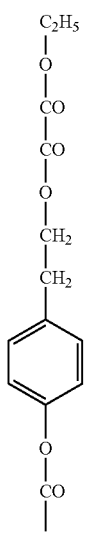
(19)
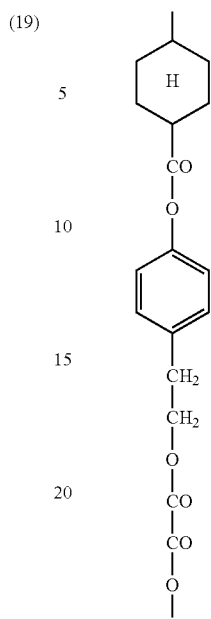
(20)
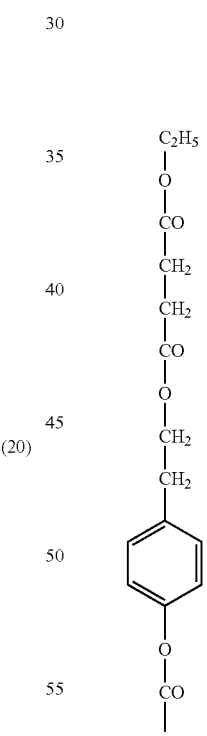
(21)

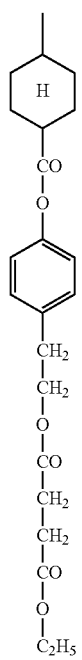
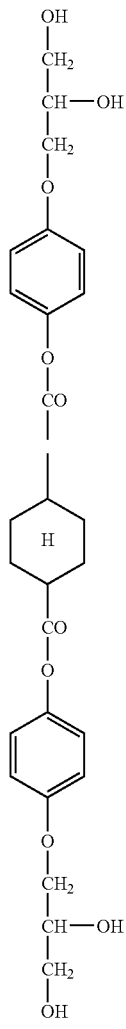
(22)
(23)
(24)
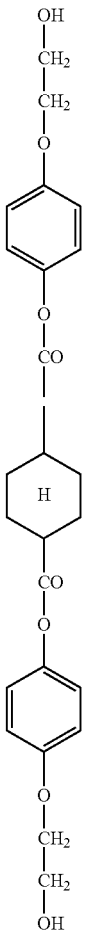

(25)
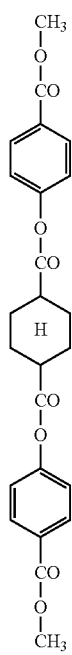
(27)
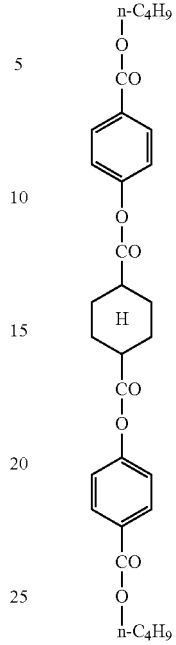
(26)
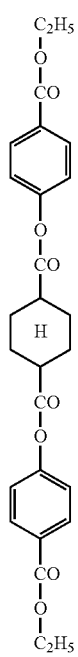
(28)
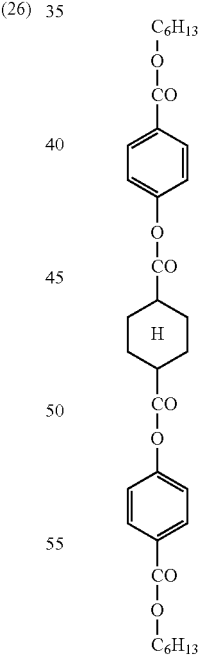

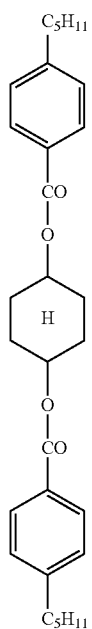
(29)
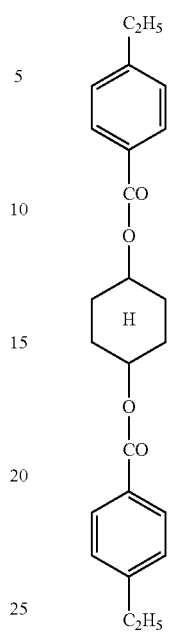
(31)
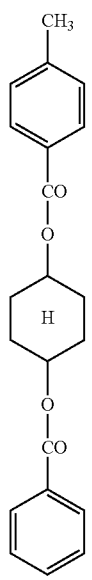
(30)
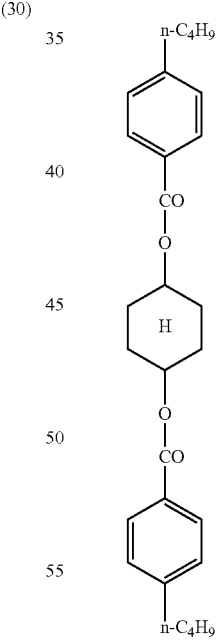
(32)

(33)
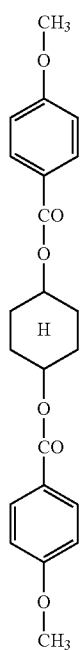
(34)
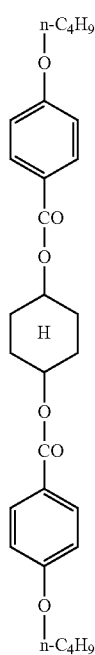
(35)
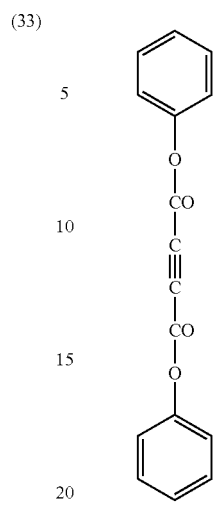
(36)
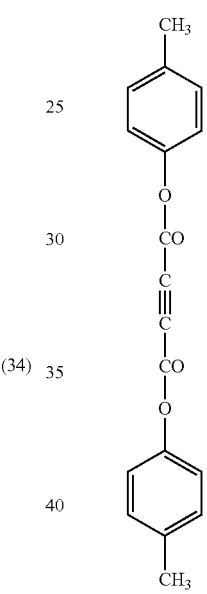
(37)
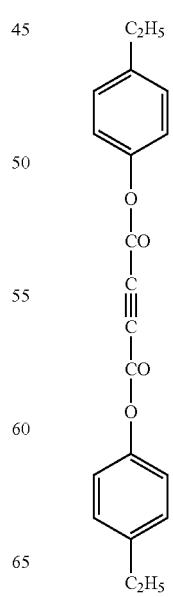

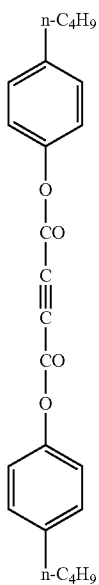
(38)
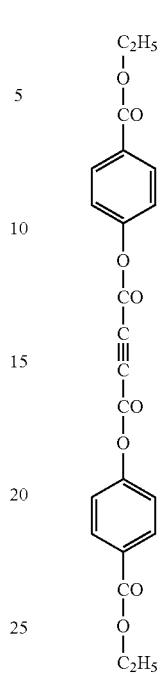
(40)
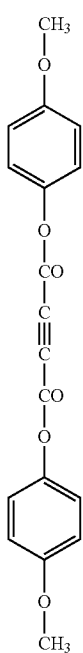
(39)
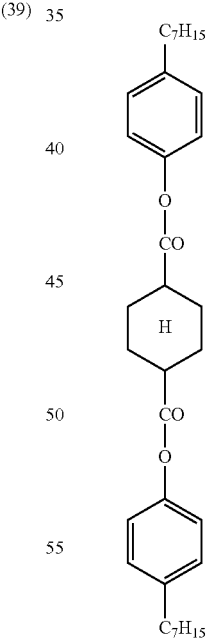
(41)

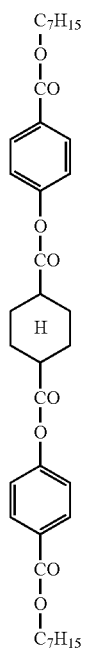 (42)
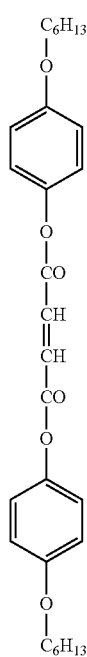 (43)
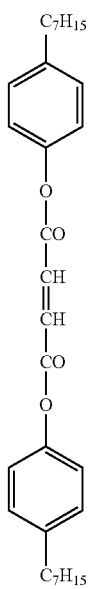 (44)
 (45)

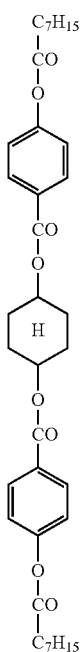
(46)
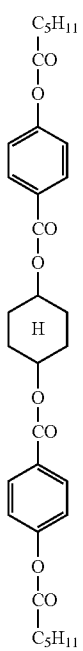
(47)
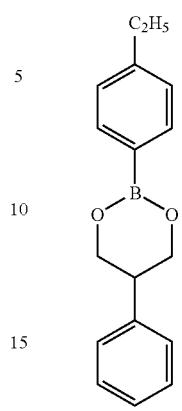
(48)
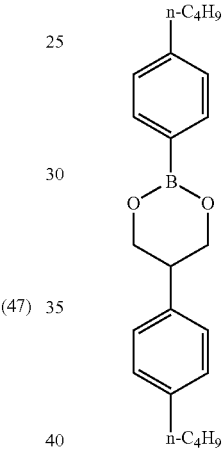
(49)
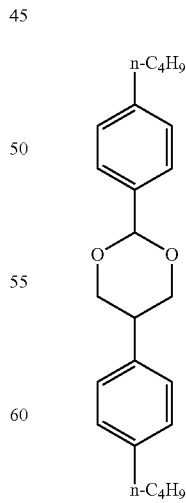
(50)

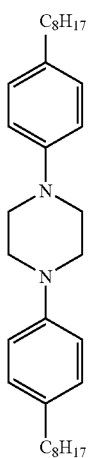
(51)
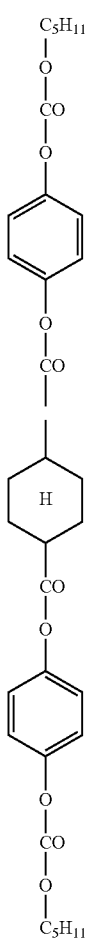
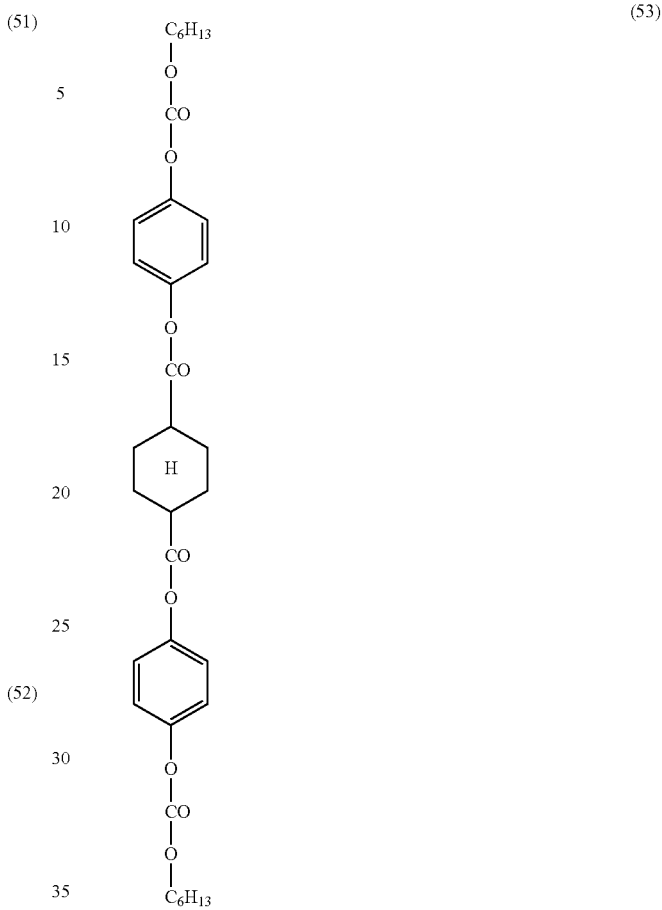
Each of the above (1) to (34), (41), (42), (46), (47), (52) and (53) has two asymmetric carbons at the 1- and 4-positions of cyclohexane ring. In spite of that, each compound of (1), (4) to (34), (41), (42), (46), (47), (52) and (53) has a symmetrical meso type-molecular structure, and hence has no optical isomer (optical activity) but geometrical isomers (trans and cis-forms). The trans-form (1-trans) and cis-form (1-cis) of the above compound (1) are shown below.
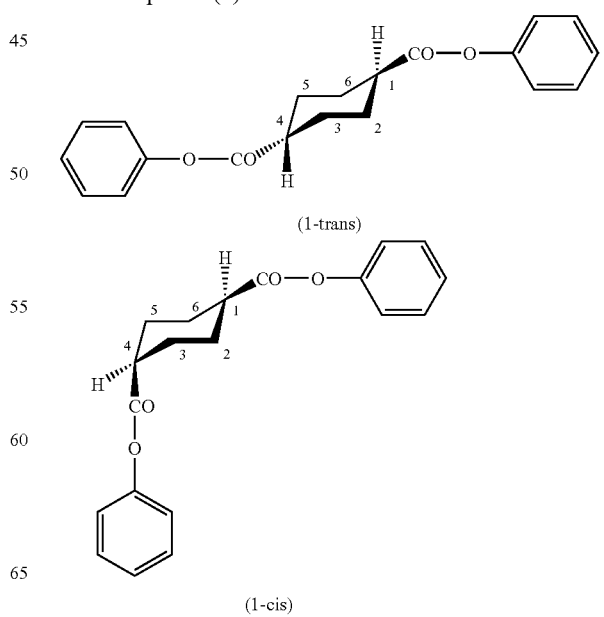

As described above, the rod-like compound preferably has a linear molecular structure. Accordingly, the trans-form is preferred to the cis-form.

Each of the above compounds (2) and (3) has not only geometrical isomers but also optical isomers (four isomers in total). With respect to the geometrical isomers, the trans-form is preferred to the cis-form. However, in view of the function, there is little difference among the optical isomers, and hence either D- or L-body may be used. Further, it may be racemate.

Each compound of (43) to (45) has trans- and cis-forms in connection with a vinylene bond at the central position. For the above-described reason, the trans-form is preferred to the cis-form.

Each compound of (10), (23), (29) and (41) in the trans-form exhibits the maximum absorption peak at the following wavelength ($\lambda$max) in the ultraviolet absorption spectrum of its solution.

10-trans: 220 nm,
23-trans: 230 nm,
29-trans: 240 nm, and
41-trans: 230 nm.

Two or more of the rod-like compounds, each of which gives the maximum absorption peak at a wavelength ($\lambda$max) shorter than 250 nm in its ultraviolet absorption spectrum in the form of solution, may be used in combination.

The rod-like compound can be prepared according to the methods described in, for example, Mol. Cryst. Liq. Cryst., 53 (1979), pp. 229; ibid., 89 (1982), pp. 93; ibid., 145 (1987), pp. 111; ibid., 170 (1989), pp. 43; J. Am. Chem. Soc., 113 (1991), pp. 1349; ibid., 118 (1996), pp. 5346; ibid., 92 (1970), pp. 1582; J. Org. Chem., 40 (1975), pp. 420; and Tetrahedron, 48 (1992), No. 16, pp. 3437.

The retardation-increasing agent is incorporated in an amount of preferably 0.1 to 30 wt. %, more preferably 0.5 to 20 wt. %, based on the amount of the polymer.

(Preparation of Polymer Film)

The polymer film is preferably prepared according to the solvent cast method. In the solvent cast method, a solution (dope) in which the polymer is dissolved in an organic solvent is used.

Examples of the organic solvent include an ether having 3 to 12 carbon atoms, a ketone having 3 to 12 carbon atoms, an ester having 3 to 12 carbon atoms, and a halogenated hydrocarbon having 1 to 6 carbon atoms.

The ether, the ketone or the ester may have a cyclic structure. A compound having two or more functional groups of ether, ketone or ester (—O—, —CO— or —COO—) is also usable as the solvent. The organic solvent may have other functional groups such as alcoholic hydroxyl. If the solvent is a compound having two or more functional groups, the number of carbon atoms is in any of the above ranges.

Examples of the ether having 3 to 12 carbon atoms include diisopropyl ether, dimethoxymethane, dimethoxy-ethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexane.

Examples of the ester having 3 to 12 carbon atoms include ethyl formate, propyl formate, pentyl formate, methyl acetate, ethyl acetate, and pentyl acetate.

Examples of the compound having two or more functional groups include 2-ethoxyethyl acetate, 2-methoxyethanol and 2-butoxyethanol.

A typical example of the halogenated hydrocarbon having 1 to 6 carbon atoms is methylene chloride. From the technical viewpoint, the halogenated hydrocarbon such as methylene chloride can be used without any problem. However, in consideration of the global environment and working conditions, the organic solvent preferably contains essentially no halogenated hydrocarbon. This means the organic solvent preferably contains halogenated hydrocarbon in an amount of less than 5 wt. % (more preferably less than 2 wt. %). Also preferably, halogenated hydrocarbon such as methylene chloride is not found in the resultant film at all.

Two or more of the organic solvents may be mixed to use. In that case, a particularly preferred solvent is a mixture of three different solvents in which the first solvent is a ketone having 3 or 4 carbon atoms, an ester having 3 or 4 carbon atoms or a mixture thereof, the second solvent is a ketone or acetoacetic ester having 5 to 7 carbon atoms, and the third solvent is an alcohol having a boiling point of 30 to 170° C. or a hydrocarbon having a boiling point of 30 to 170° C. Preferred examples of the first solvent include acetone, methyl acetate, methyl formate and ethyl formate. Preferred examples of the second solvent include cyclo-pentanone, cyclohexanone and methyl acetylacetate.

The third solvent is an alcohol having a boiling point of 30 to 170° C. or a hydrocarbon having a boiling point of 30 to 170° C. The alcohol is preferably a monohydric alcohol. The hydrocarbon moiety of the alcohol may have a straight chain structure, a branched structure or a cyclic structure, and is preferably a saturated aliphatic hydrocarbon. The hydroxyl of the alcohol may be primary, secondary or tertiary. Examples of the alcohol include methanol (b.p.: 64.65° C.), ethanol (78.325° C.), 1-propanol (97.14° C.), 2-propanol (82.4° C.), 1-butanol (117.9° C.), 2-butanol (99.5° C.), t-butanol (82.45° C.), 1-pentanol (137.5° C.), 2-methyl-2-butanol (101.9° C.), cyclohexanol (161° C.), 2-fluoroethanol (103° C.), 2,2,2-trifluoroethanol (80° C.), 2,2,3,3-tetrafluoro-1-propanol (109° C.), 1,3-difluoro-2-propanol (55° C.), 1,1,1,3,3,3-hexa-2-methyl-2-propanol (62° C.), 1,1,1,3,3,3-hexafluoro-2-propanol (59° C.), 2,2,3,3,3-pentafluoro-1-propanol (80° C.), 2,2,3,4,4,4-hexafluoro-1-butanol (114° C.), 2,2,3,3,4,4,4-heptafluoro-1-butanol (97° C.), perfluoro-tert-butanol (45° C.), 2,2,3,3,4,4,5,5-octafluoro-1-pentanol (142° C.), 2,2,3,3,4,4-hexafluoro-1,5-pentanediol (111.5° C.), 3,3,4,4,5,5,6,6,7,7,8,8,8-tridecafluoro-1-octanol (95° C.), 2,2,3,3,4,4,5,5,6,6,7,7,8,8,8-pentadecafluoro-1-octanol (165° C.), 1-(pentafluorophenyl)ethanol (82° C.) and 2,3,4,5,6-pentafluorobenzyl alcohol (115° C.). Two or more of the alcohols are preferably mixed and used in combination.

The hydrocarbon may have a straight chain structure, a branched structure or a cyclic structure. Either an aromatic hydrocarbon or an aliphatic one can be used. The aliphatic hydrocarbon may be unsaturated. Examples of the hydrocarbon include cyclohexane (b.p.: 80.7° C.), hexane (69° C.), benzene (80.1° C.), toluene (110.1° C.) and xylene (138.4° C. to 144.4° C.).

In the mixed solvent, the first solvent is contained preferably in an amount of 30 to 95 wt. %, more preferably in an amount of 40 to 90 wt. %, most preferably in an amount of 50 to 90 wt. %. Each of the second and third solvents is contained preferably in an amount of 1 to 40 wt. %, more preferably in an amount of 3 to 30 wt. %.

Preferred examples of the combination of the polymers and the solvents include polymer/methyl acetate/cyclohexanone/methanol/ethanol (X/(70-X)/20/5/5, by weight), polymer/methyl acetate/methyl ethyl ketone/acetone/methanol/ethanol (X/(50-X)/20/20/5/5, by weight), polymer/acetone/methyl acetoacetate/ethanol (X/(75-X)/20/5/5, by weight), polymer/methyl acetate/cyclopentanone/methanol/ethanol (X/(80-X)/10/5/5, by weight), polymer/methyl acetate/1,3-di-oxolan/methanol/ethanol (X/(70-X)/20/515, by weight), polymer/methyl acetate/dioxane/acetone/methanol/ethanol (X/(60-X)/20/10/5/5, by weight), and polymer/1,3-dioxolan/cyclohexanone/methyl ethyl ketone/methanol/ethanol (X/(55-X)/20/10/5/5, by weight). In the above, X represents the amount of the polymer in terms of weight part, and is preferably in the range of 10 to 25, more preferably in the range of 15 to 23.

When the polymer is dissolved in the solvent in a container, the container may be filled with inert gas (such as nitrogen gas). The prepared polymer solution (dope) must be viscous enough to form a film when cast on a support. The viscosity of the dope immediately before casting is normally in the range of 10 to 2,000 ps·s, preferably in the range of 30 to 400 ps·s.

The polymer solution (dope) can be prepared according to an ordinary method. The ordinary method means that the solution is prepared at a temperature of not lower than 0° C. (room temperature or elevated temperature). The polymer solution (dope) can be prepared through a common process by means of a common apparatus in the normal solvent cast method. In the normal process, a halogenated hydrocarbon (particularly, methylene chloride) is preferably used as the solvent.

The amount of the polymer in the solution is preferably in the range of 10 to 40 wt. %, more preferably in the range of 10 to 30 wt. %. To the organic (main) solvent, additives described below may be optionally added.

The polymer and the organic solvent are mixed and stirred at room temperature (0 to 40° C.) to prepare the solution. For preparing the concentrated solution, the preparation may be carried out at an elevated temperature under a high pressure. In that case, the polymer and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas (such as nitrogen gas) into the vessel, or by heating and evaporating the solvent to increase the vapor pressure. Further, the components can be added to the vessel at a high pressure after the vessel is sealed.

The vessel is preferably heated from outside. For example, a jacket heater is preferably used. Otherwise, liquid heated with a plate-heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew a liquid membrane formed on the inside wall.

In the vessel, various meters (such as pressure gauge and thermometer) may be provided. After the components are dissolved in the solvent in the vessel, the prepared dope may be cooled and then taken out of the vessel, or may be taken out and then cooled with a heat exchanger.

The solution can be prepared according to the cooling dissolution method, which makes it possible to dissolve the polymer in an organic solvent in which the polymer cannot be dissolved by a conventional process. Further, according to the method, the polymer can be rapidly and homogeneously dissolved in an organic solvent in which the polymer can be dissolved by a conventional process.

First in the process of cooling dissolution method, the polymer is gradually added while stirred into an organic solvent at room temperature. The amount of the polymer in the mixture is preferably in the range of 10 to 40 wt. %, more preferably in the range of 10 to 30 wt. %. Various additives described below may be added in the mixture.

The prepared mixture is cooled to a temperature of −100 to −10° C. (preferably −80 to −10° C., more preferably −50 to −20° C., most preferably −50 to −30° C.). The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C./second, a technical upper limit is 1,000° C./second, and a practical upper limit is 100° C./second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C. (preferably 0 to 150° C., more preferably 0 to 120° C., most preferably 0 to 50° C.). Through the warming procedure, the polymer is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the warming rate is 10,000° C./second, a technical upper limit is 1,000° C./second, and a practical upper limit is 100° C./second. The warming rate means the change of temperature at the warming step per the time taken to complete the warming step. The change of temperature means the difference between the temperature at which the warming step is started and the temperature at which the warming step is completed.

Thus, a homogeneous solution can be prepared. If the polymer is not sufficiently dissolved, the cooling and warming procedures may be repeated. It can be judged by observation with the eyes whether the polymer is sufficiently dissolved or not.

In the process of cooling dissolution method, a sealed vessel is preferably used to prevent contamination of water, which may be caused by dew condensation at the cooling step. Further, the mixture may be cooled under an elevated pressure and heated under a reduced pressure so that the time taken to complete the cooling and heating steps can be shortened, respectively, and hence a vessel resisting pressure is preferably used to conduct the procedures under elevated and reduced pressures.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at approx. 33° C. Below that temperature, the solution is in the form of homogeneous gel. The solution, therefore, must be kept at a temperature above the pseudo-phase transition point, preferably at a temperature higher than the pseudo-phase transition point by approx. 10° C. The pseudo-phase transition point depends upon various conditions such as the organic solvent, the acetic acid content, the viscosity average polymerization degree and the concentration of cellulose acetate.

The polymer film is formed from the prepared polymer solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45 (1970)-4554, 49 (1974)-5614, Japanese Patent Provisional Publication Nos. 60 (1985)-176834, 60 (1985)-203430 and 62 (1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5 (1993)-17844. The procedure can shorten the time taken to complete the steps of cooling to peeling. For performing the procedure, the cast dope must gel at the surface temperature of the drum or band.

Two or more polymer solutions (dopes) may be prepared, and from them two or more layers may be formed by the solvent cast method to prepare a layered polymer film. The dopes are cast on a drum or a band, and the solvent is evaporated to form the film. The solid content of each dope is preferably controlled in the range of 10 to 40%. The surface of the drum or band is preferably beforehand polished to be a mirror.

In the case where two or more polymer solutions are cooperatively cast, two or more outlets are arranged at intervals along the running direction of the support (drum or band), and from each outlet each polymer solution is cast to form a layered film (Japanese Patent Provisional Publication Nos. 61 (1986)-158414, 1 (1989)-122419 and 11 (1999)-198285). Otherwise, polymer solutions may be cast from two outlets to form a film (Japanese Patent Publication No. 60 (1985)-27562, Japanese Patent Provisional Publication Nos. 61 (1986)-94724, 61 (1986)-947245, 61 (1986)-104813, 61 (1986)-158413 and 6 (1994)-134933). Further, a flow of high-viscous polymer solution may be enclosed with a flow of low-viscous one to form a layered flow, and the high- and low-viscous solutions in the layered flow may be simultaneously extruded to produce a film (Japanese Patent Provisional Publication No. 56 (1981)-162617).

Further, the method disclosed in Japanese Patent Publication No. 44 (1969)-20235 may be adopted. In the disclosed process, a polymer solution is cast on the support from one outlet to form a film. After peeled from the support, the formed film is turned over and again placed on the support. On the thus appearing surface (having been in contact with the support), another polymer solution is cast from another outlet to form a film.

The used polymer solutions may be the same or different from each other. The function of each formed polymer layer can be given by each corresponding solution extruded from each outlet.

Other functional layers (e.g., adhesive layer, dye layer, antistatic layer, anti-halation layer, UV absorbing layer, polarizing layer) can be simultaneously formed together with the polymer layer in the above manner.

In a conventional single layer preparation process, it is necessary to extrude a polymer solution having such high concentration and such high viscosity that the resultant film may have the aimed thickness. Accordingly, that polymer solution is often so unstable that solid contents are deposited to cause troubles and to impair the planeness. To avoid the problem, plural concentrated polymer solutions are simultaneously extruded from outlets onto the support. The thus-prepared thick film has excellent planeness. In addition, since the concentrated solutions are used, the film is so easily dried that the productivity (particularly, production speed) can be improved.

A plasticizer can be added into the polymer solution to enhance mechanical strength of the resultant film or to shorten the time for drying. The plasticizer is, for example, a phosphate ester or a carbonate ester. Examples of the phosphate ester used as the plasticizer include triphenyl phosphate (TPP) and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, most preferably in the range of 3 to 15 wt. % based on the amount of the polymer.

Further, a deterioration inhibitor (e.g., oxidation inhibitor, peroxide decomposer, radical inhibitor, metal inactivating agent, oxygen scavenger, amine) may be incorporated in the polymer film. The deterioration inhibitor is described in Japanese Patent Provisional Publication Nos. 3 (1991)-199201, 5 (1993)-1907073, 5 (1993)-194789, 5 (1993)-271471 and 6 (1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA).

In order to make the film easily treatable during the production process, a matting layer containing a matting agent and a polymer may be provided on one or each surface of the film. As the matting agent and the polymer, materials described in Japanese Patent Provisional Publication No. 10 (1998)-44327 are preferably used.

The polymer film can be stretched to control the retardation. The stretching ratio (the ratio of length increased by stretching based on the original length) is preferably in the range of 3 to 100%, more preferably in the range of 10 to 80%, most preferably in the range of 15 to 60%.

The polymer film has a thickness preferably in the range of 10 to 200 μm, more preferably in the range of 20 to 150 μm, most preferably in the range of 30 to 140 μm.

The birefringence of the film measured at 550 nm is preferably in the range of 0.00196 to 0.01375, more preferably in the range of 0.00168 to 0.006875, most preferably in the range of 0.00275 to 0.00458.

(Surface Treatment of Polymer Film)

The polymer film is preferably subjected to surface treatment. Examples of the surface treatment include corona discharge treatment, glow discharge treatment, flame treatment, acid treatment, alkali treatment, and ultraviolet (UV) treatment.

For ensuring the planeness of the film, the above treatments are carried out preferably at a temperature not higher than Tg (glass transition temperature) of the film.

In the case where the film is used as a protective film of the polarizing plate, the acid or alkali treatment is preferably carried out in consideration of adhesion between the film and the polarizing membrane.

In the alkali treatment, the steps of immersing the film surface in an alkaline solution, neutralizing with an acidic solution, washing with water, and drying are preferably circularly carried out.

Examples of the alkaline solution include aqueous solutions of KOH and NaOH. The normality of hydroxyl ion is preferably in the range of 0.1 to 3.0 N, more preferably in the range of 0.5 to 2.0 N. The temperature of the solution is preferably in the range of room temperature to 90° C., more preferably in the range of 40 to 70° C.

In order to enhance the adhesion to a layer (e.g., adhesive layer, orientation layer or optically anisotropic layer) provided on the polymer film, the film may be subjected to surface treatment (e.g., glow discharge treatment, corona discharge treatment, ultraviolet (UV) treatment, flame treatment). The polymer film preferably contains a ultraviolet absorbing agent. Further, as described in Japanese Patent Provisional Publication No. 7 (1995)-333433, an undercoating layer (adhesive layer) may be provided on the polymer film. The thickness of the undercoating layer is preferably in the range of 0.1 to 2 μm, more preferably in the range of 0.2 to 1 μm.

(Circularly Polarizing Plate)

A circularly polarizing plate comprises a (linearly) polarizing membrane and a λ/4 plate.

On both sides of the membrane, two transparent protective films are generally provided. One of the protective films may be the λ/4 plate (the aforementioned polymer film), and the other may be a normal cellulose acetate film. Both of them may be normal cellulose acetate films.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

In the circularly polarizing plate, the λ/4 plate and the polarizing membrane are placed so that the slow axis of the λ/4 plate may be essentially at 450 to the transmission axis of the membrane.

(Liquid Crystal Display Comprising Circularly Polarizing Plate)

FIG. 1 schematically shows a basic structure of liquid crystal display of reflection type comprising a circularly polarizing plate.

The liquid crystal display of reflection type shown in FIG. 1 comprises a lower substrate (1), a reflective electrode (2), a lower orientation layer (3), a liquid crystal layer (4), an upper orientation layer (5), a transparent electrode (6), an upper substrate (7), a λ/4 plate (8) and a polarizing membrane (9), layered in this order.

A combination of the lower substrate (1) and the reflective electrode (2) constitutes a reflection board. Another combination of the lower substrate (1) to the upper substrate (7) constitutes a liquid crystal cell.

The λ/4 plate (8) may be placed at any position between the reflection board and the polarizing membrane (9). The λ/4 plate (8) and the polarizing membrane (9) cooperatively functions as a circularly polarizing plate.

For displaying a color image, a color filter layer is additionally provided. The color filter layer is preferably placed between the reflective electrode (2) and the lower orientation layer (3) or between the upper orientation layer (5) and the transparent electrode (6).

In place of the reflective electrode (2) in FIG. 1, a transparent electrode may be used in combination with a reflection board. The reflection board is preferably a metal board. If the reflection board has a smooth surface, rays parallel to the normal of the surface are often predominantly reflected to give a small viewing angle. Therefore, the surface of the reflection board may be made rugged (as described in Japanese Patent No. 275,620). Otherwise, a light-diffusing film may be provided on one surface (cell side or air side) of the polarizing membrane.

The liquid crystal cell is preferably TN (twisted nematic) mode, STN (supper twisted nematic) mode, or HAN (hybrid aligned nematic) mode.

The liquid crystal cell of TN mode has a twist angle preferably in the range of 40 to 100°, more preferably in the range of 50 to 90°, most preferably in the range of 60 to 80°. The product (Δn·d) of refractive anisotropy (Δn) and thickness (d) of the liquid crystal layer is preferably in the range of 0.1 to 0.5 μm, more preferably in the range of 0.2 to 0.4 μm.

The liquid crystal cell of STN mode has a twist angle preferably in the range of 180 to 360°, more preferably in the range of 220 to 270°. The product (Δn·d) of refractive anisotropy (Δn) and thickness (d) of the liquid crystal layer is preferably in the range of 0.3 to 1.2 μm, more preferably in the range of 0.5 to 1.0 μm.

In the liquid crystal cell of HAN mode, it is preferred that liquid crystal molecules be essentially vertically aligned on one substrate and that the pre-tilt angle on the other substrate be in the range of 0 to 45°. The product (Δn·d) of refractive anisotropy (Δn) and thickness (d) of the liquid crystal layer is preferably in the range of 0.1 to 1.0 μm, more preferably in the range of 0.3 to 0.8 μm. The substrate on which the liquid crystal molecules are vertically aligned may be on the reflection board side or on the opposite side (transparent electrode side).

The liquid crystal display of reflection type may be designed normally white mode (in which a bright or dark image is displayed when the applied voltage is low or high, respectively) or normally black mode (in which a dark or bright image is displayed when the applied voltage is low or high, respectively). The normally white mode is preferred.

(Touch Panel)

A touch panel comprises a fixed substrate placed near the display and a flexible substrate facing the fixed one. Each substrate has a transparent electrode on the surface facing the other substrate. Both substrates are preferably made of transparent optical material so as to ensure qualities of the displayed image. Examples of the optical material include glass, amorphous materials, polymers (e.g., poly(ether sulphone), polycarbonate, polyarylate, polyethylene terephthalate, cellulose ester). The λ/4 plate according to the invention can be provided independently of the touch panel, or may be used as either the fixed substrate or the flexible one. Further, the λ/4 plate of the invention can be used as each of the fixed and flexible substrates. It is particularly preferred to use the λ/4 plate as the flexible substrate.

The transparent electrodes on the fixed and flexible substrates are placed to form a gap between them. Normally in the gap, a layer of air is formed. The gap may be filled with a liquid having a refractive index close to that of the transparent electrodes, so as to control optical characters. Further, an undercoating layer or an overcoating layer may be provided on the substrate side or the opposite side of the electrode, respectively, to reduce reflection of light. The surface of the transparent electrode may be roughened to keep the surface from sticking and to improve the touching durability. Spacers may be provided in the gap. As the spacers, particles (dot spacers) can be inserted between the electrodes. Otherwise, framing spacers may be laminated on the peripheral area of the fixed or flexible substrate.

The touch panel works in a digital or analog system. In the digital system, the position where data are inputted is digitally determined according to the position where the electrodes are made in contact by touching. In the analog system, voltages are applied, for example, on the fixed substrate along the X-axis (horizontally) and on the flexible substrate along the Y-axis (vertically). When the thus-electrified touch panel is touched and pressed, the electrodes are made in contact to change the resistance in the X and Y directions. According to the changes of the resistance, the position where data are inputted can be determined.

The touch panel is preferably used in combination with the display. The touch panel may be separated from the screen of display or may be unified with the screen.

In the case where the touch panel is used in combination with the polarizing plate, the polarizing plate can be placed between the touch panel and the display. In a different way, the polarizing plate may be placed outside (on the observer side) of the touch panel. The latter constitution is called "inner type", which is preferred in the invention because it is excellent both in antiglare and in reducing the reflection of external light.

(Transparent Electrically Conductive Membrane)

The transparent electrically conductive membrane used in the touch panel has a surface resistance of preferably $10^4\Omega$ per square or less, more preferably 1,000Ω per square or less.

The conductive membrane is particularly preferably provided on at least one surface of the λ/4 plate of the invention, so that it can be used as a touch panel of inner type.

In order to control the surface resistance in the above range, a dispersion of metal alkoxide or electrically conductive fine particles is applied to form the transparent electrically conductive membrane. The conductive membrane can be also formed simultaneously with the polymer film by cooperative casting. Otherwise, it can be prepared by vacuum film-forming process (e.g., sputtering, vacuum deposition, ion-plating or CDV process). In another different way, the conductive membrane can be formed by gas-phase growing method under atmospheric pressure.

The conductive membrane is normally provided on one surface, but may be provided on each surface of the film.

In the case where the membrane is formed by applying a dispersion of electrically conductive fine particles, the formed membrane contains at least one metal, metal oxide and/or metal nitride in the form of fine particles. Examples of the metal include gold, silver, copper, aluminum, iron, nickel, palladium, platinum, and alloys thereof. Silver is preferred, and in consideration of weathering resistance an alloy of silver and palladium is more preferred. The alloy contains palladium preferably in a content of 5 to 30 wt. %. If the content of palladium is too small, the resultant membrane has poor weathering resistance. If the alloy contains palladium too much, the electrical conductivity is lowered. The metal fine particles can be prepared according to the low-vacuum evaporation method or the colloidal metal method, in which an aqueous solution of metal salt is reduced with a reducing agent such as iron (II), hydrazine, boron hydride or amine (e.g., hydroxyethylamine).

Examples of the metal oxide include $In_2O_3$ (doped with Sn), $SnO_2$ (doped with F, Sb), ZnO (doped with Al, Ga), $TiO_2$, $Al_2O_3$, $SiO_2$, MgO, BaO, $MoO_3$, $V_2O_5$ and complex oxides thereof.

Examples of the metal nitride include TiN.

The electrically conductive fine particles has a mean size preferably in the range of 1.0 to 700 nm, more preferably in the range of 2.0 to 300 nm, and most preferably in the range of 5.0 to 100 nm. If the particles are too large, they absorb light so much that the light transmittance of the membrane decreases and accordingly that the haze increases. On the other hand, if the mean size is less than 1 nm, it is difficult to disperse the particles and the resultant membrane has too large a surface resistance to achieve the object of the invention.

For forming the membrane of electrically conductive fine particles, electrically conductive fine particles are dispersed in an aqueous solution or organic solvent to prepare a coating solution. The coating solution is then applied to form the layer. Prior to applying the coating solution, the surface on which the solution is to be applied can be subjected to surface treatment or coated with an undercoating layer. Examples of the surface treatment include corona discharge treatment, glow dis-charge treatment, chromic acid (wet) treatment, flame treatment, hot air-blowing treatment, and ozone-ultraviolet (UV) treatment. Examples of the material of the undercoating layer include vinyl chloride, vinylidene chloride, butadiene, (meth)acrylic ester, vinyl ester, copolymers thereof, latex, and aqueous polymers (e.g., gelatin). In order to disperse the conductive fine particles stably, an aqueous solution is preferably used. Examples of the solvent compatible and preferably used with water include alcohols (e.g., ethyl alcohol, n-propyl alcohol, iso-propyl alcohol, dibutyl alcohol, methyl cellosolve, butyl cellosolve). The amount of the conductive fine particles is preferably in the range of 10 to 1,000 $mg/m^2$, more preferably in the range of 20 to 500 $mg/m^2$, most preferably in the range of 50 to 150 $mg/m^2$. If the amount of the particles is too small, the resultant layer has an insufficient conductivity. If it is too large, the transparency is lowered.

The transparent electrically conductive membrane can contain a binder, or otherwise may consist of essentially only the electrically conductive fine particles without a binder. The binder may be a hydrophilic binder, a hydrophobic binder or latex.

Examples of the hydrophilic binder include gelatin, gelatin derivatives, agar, sodium alginate, starch, polyvinyl alcohol, polyacrylic copolymer, maleic anhydride copolymer, carboxymethyl cellulose, carboxyethyl cellulose, hydroxymethyl cellulose, and hydroxyethyl cellulose. Examples of the hydrophobic binder include cellulose esters (e.g., nitrocellulose, diacetyl cellulose, triacetyl cellulose, methyl cellulose), vinyl polymers (e.g., vinyl chloride, vinylidene chloride, vinyl acrylate), polyamide, and polyester.

The conductive membrane can be treated with heat or water to increase conductivity and transparency. The temperature of heat treatment depends on heat resistance of the polymer film, and is preferably 150° C. or below, more preferably in the range of 100 to 150° C. If it is above 150° C., the polymer film is liable to deform by heat. If it is 100° C. or below, the heat treatment cannot give desired effect. Accordingly, if the temperature is low, the treatment must be conducted for a long time.

In the heat treatment, the film (in the form of web) on which the membrane is to be formed is preferably transferred through a heating zone so that the membrane can be evenly heated. The time for heating can be controlled by adjusting the length of the zone and the transferring speed. In a different way of the heat treatment, a roll of the film may be heated in a thermostat. However, in that case, it is necessary to set the heating time in consideration of uneven thermal conduction.

For improving the effect of the heat treatment, the transparent electrically conductive membrane may be treated with water (e.g., washed with water). The membrane is, for example, coated with water alone. Examples of the coating method include dip coating and wire-bar coating. The membrane may be watered with a spray or a shower. After the membrane was watered, excess water may be wiped off with wire-bar, rod-bar or air-knife, if needed.

The water treatment lowers the surface resistance of the conductive membrane having been subjected to the heat treatment, and further increases the transparency and levels the transmission spectrum. Furthermore, if the membrane is subjected to the water treatment, the anti-reflection layer remarkably lowers the reflectance.

The vacuum film-forming process is described in "New development of transparent electrically conductive layer (Japanese)", CMC publishers, "Monthly Display", Yutaka Sawada, September 1999.

Examples of the metal oxide contained in the membrane include $In_2O_3$ (doped with Sn, including ITO), $SnO_2$ (doped with F, Sb), ZnO (doped with Al, Ga) and complex oxides thereof (e.g., $In_2O_3$—ZnO). Examples of the metal nitride include TiN.

The membrane may contain silver.

In the case where the membrane is formed on the polymer film by sputtering, the surface of the membrane is preferably coated with polymer (e.g., fluorocarbon resin, acrylic resin, silicone resin, propylene resin, vinyl resin) and inorganic material (e.g., $SiO_2$, $TiO_2$, $ZnO_2$, $SnO_2$). The coating layer has a thickness preferably in the range of 2 nm to 100 μm, more preferably in the range of 2 nm to 50 μm, most preferably in the range of 2 nm to 10 μm. The membrane mainly containing indium oxide can be, for example, formed according to a reactive sputtering process in which a metal target mainly comprising metal indium or a sintered target mainly comprising indium oxide is used. From the viewpoint of controlling the reaction, the sintered target is preferably adopted. In the reactive sputtering process, an inert gas (e.g., argon) and oxygen gas are used as the sputtering gas and the reactive gas, respectively. As the discharging method, DC magnetron sputter and RF magnetron sputter can be used. The flow of oxygen gas is preferably controlled according to the plasma emission monitoring method.

The polymer film provided with the transparent electrically conductive membrane has a light-transmittance of preferably 50% or more, more preferably 60% or more, further preferably 70% or more, most preferably 80% or more.

The thickness of the membrane is, if it comprises ITO, in the range of 10 to 100 nm, preferably in the range of 15 to 70 nm. The whole membrane may be used as an electrode. Otherwise, after the electrode is formed on the whole membrane, the membrane is subjected to resist and etching treatments to form a pattern electrode. Thus, the polymer film provided with the transparent electrically conductive membrane is prepared in the form of a sheet.

For producing the touch panel, the above film sheet and a counter transparent electrically conductive sheet (including glass sheet) are faced to each other so that the conductive membrane (layer) of each sheet may be inside. In the gap between them, particles (dot spacers) having a thickness of 0.02 to 1.0 mm are, for example, provided. The counter conductive sheet may be the above polymer film, another electrically conductive sheet or a glass sheet having a conductive layer. In other words, the aforementioned polymer film is used as at least one of the facing two conductive sheets in the touch panel of the invention. The thus-prepared touch panel is placed under the polarizing plate on the incident light side in the liquid crystal display of inner type.

(Liquid Crystal Display of Reflection Type Equipped with Touch Panel)

The touch panel can be used in combination with various display devices. Examples of the display device include cathode ray tube (CRT), plasma display (PDP), field emission display (FED), inorganic EL device, organic EL device, and liquid crystal display. The phase retarder or circularly polarizing plate of the invention keeps these display devices from reflecting outer light. It is preferred to use the touch panel in combination with a liquid crystal display (particularly, of reflection type).

Figure 2:
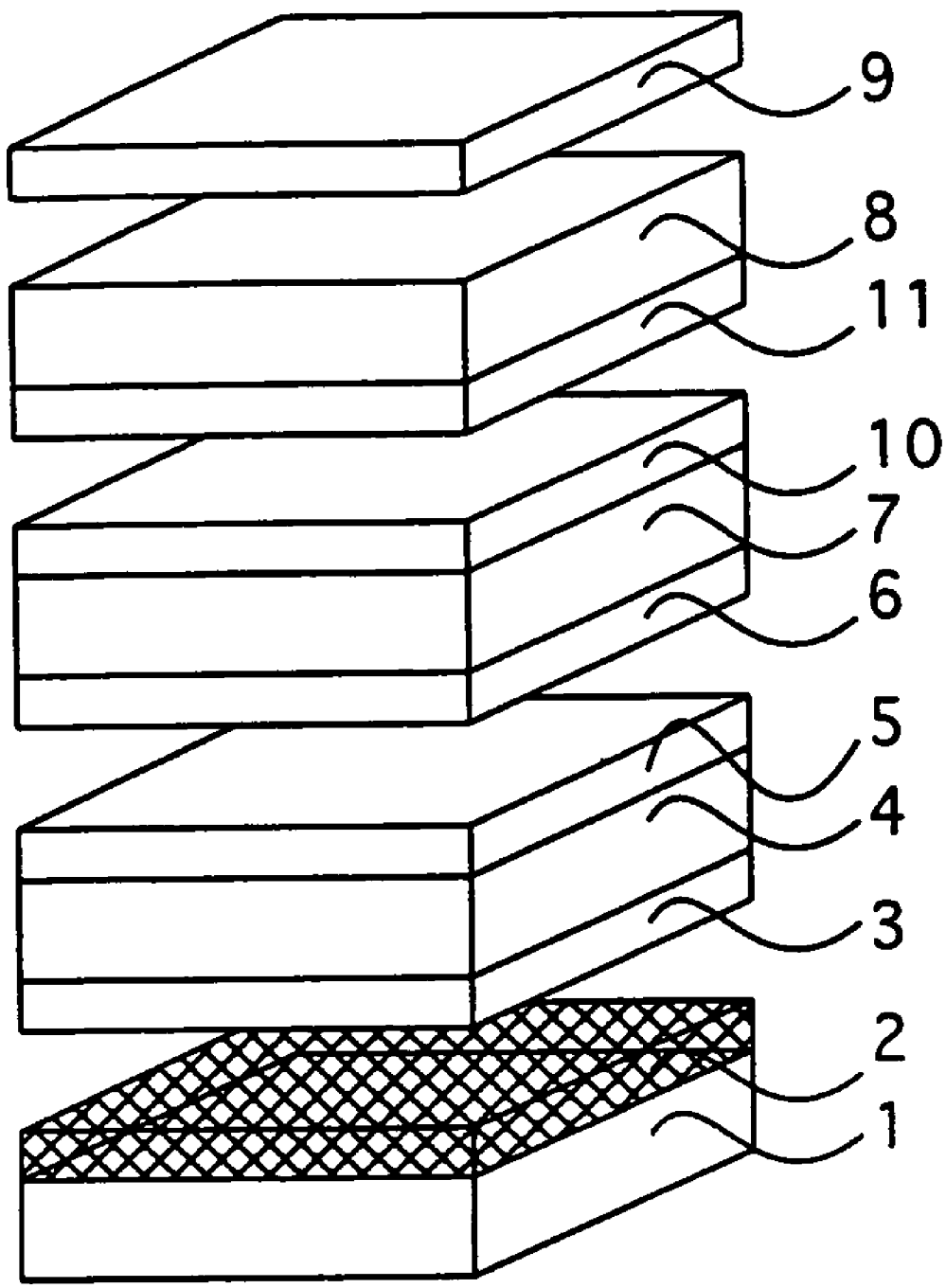
FIG. 2 schematically shows a basic structure of liquid crystal display of reflection type equipped with a touch panel.

FIG. 2 schematically shows a basic structure of liquid crystal display of reflection type comprising the touch panel.

The liquid crystal display of reflection type comprising the touch panel of inner type shown in FIG. 2 comprises a lower substrate (1), a reflective electrode (2), a lower orientation layer (3), a liquid crystal layer (4), an upper orientation layer (5), a transparent electrode (6), an upper substrate (7), a transparent electrically conductive membrane (10), another transparent electrically conductive membrane (11), a λ/4 plate (8) and a polarizing membrane (9), layered in this order. A combination of the lower substrate (1) to the upper substrate (7) constitutes a liquid crystal cell. A gap is formed between the conductive membranes (10) and (11), and a composition of the conductive membrane (10) to the polarizing membrane (9) serves as a touch panel of inner type. In the display shown in FIG. 2, the upper substrate (7) also functions as a fixed substrate of touch panel. On the fixed substrate, the conductive membrane is formed.

Figure 3:
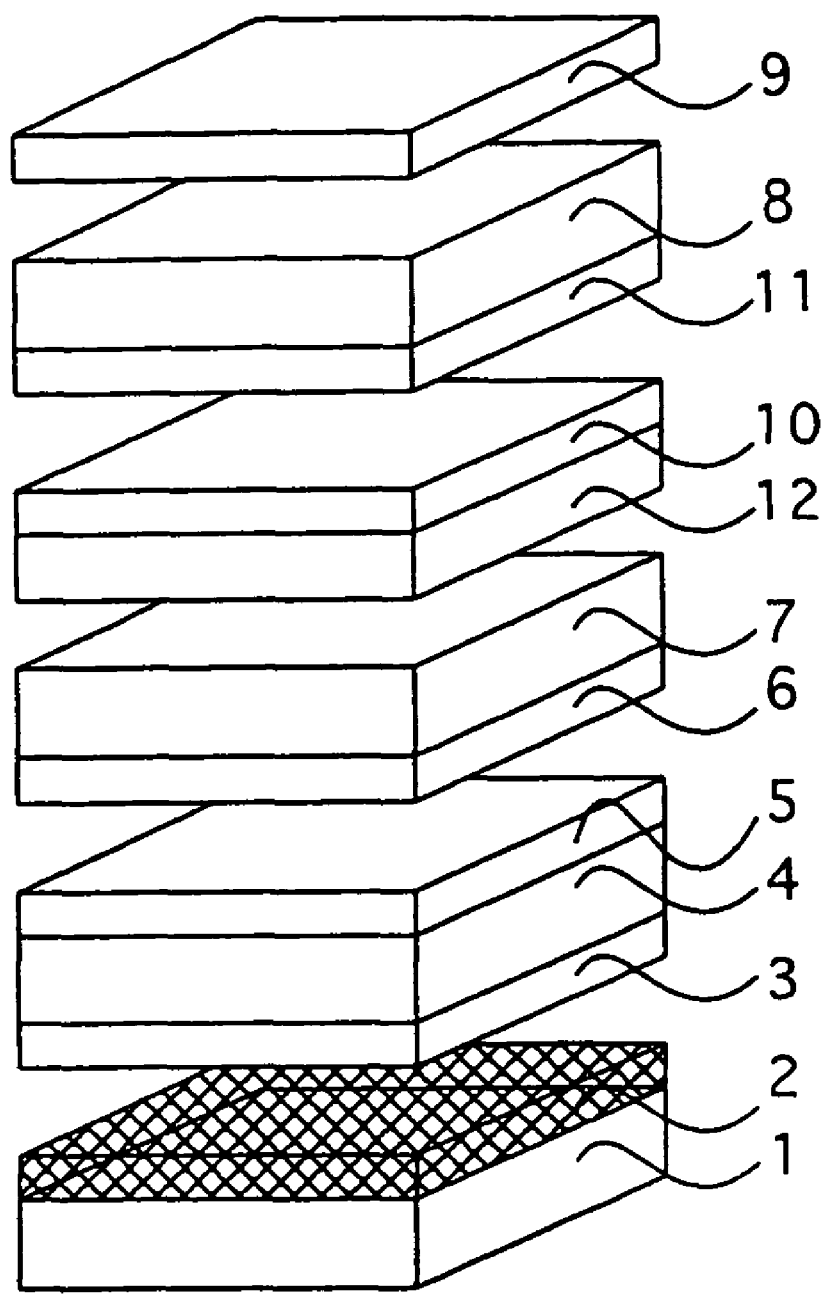
FIG. 3 schematically shows another basic structure of liquid crystal display of reflection type equipped with a touch panel.

FIG. 3 schematically shows another basic structure of liquid crystal display of reflection type comprising the touch panel.

The liquid crystal display of reflection type comprising the touch panel of inner type shown in FIG. 3 comprises a lower substrate (1), a reflective electrode (2), a lower orientation layer (3), a liquid crystal layer (4), an upper orientation layer (5), a transparent electrode (6), an upper substrate (7), a fixed substrate (12), a transparent electrically conductive membrane (10), another transparent electrically conductive membrane (11), a λ/4 plate (8) and a polarizing membrane (9), layered in this order. A combination of the lower substrate (1) to the upper substrate (7) constitutes a liquid crystal cell. A gap is formed between the conductive membranes (10) and (11), and a composition of the fixed substrate (12) to the polarizing membrane (9) serves as a touch panel of inner type.

Examples of the display modes include TN (twisted nematic) mode, STN (super twisted nematic) mode, HAN (hybrid aligned nematic) mode, and GH (guest-host) mode.

The liquid crystal cell of TN mode has a twist angle preferably in the range of 40 to 100°, more preferably in the range of 50 to 90°, most preferably in the range of 60 to 80°. The product (Δn·d) of refractive anisotropy (Δn) and thickness (d) of the liquid crystal layer is preferably in the range of 0.1 to 0.5 μm, more preferably in the range of 0.2 to 0.4 μm.

The liquid crystal cell of STN mode has a twist angle preferably in the range of 180 to 360°, more preferably in the range of 220 to 270°. The product (Δn·d) of refractive anisotropy (Δn) and thickness (d) of the liquid crystal layer is preferably in the range of 0.3 to 1.2 μm, more preferably in the range of 0.5 to 1.0 μm.

In the liquid crystal cell of HAN mode, it is preferred that liquid crystal molecules be essentially vertically aligned on one substrate and that the pre-tilt angle on the other substrate be in the range of 0 to 45°. The product (Δn·d) of refractive anisotropy (Δn) and thickness (d) of the liquid crystal layer is preferably in the range of 0.1 to 1.0 μm, more preferably in the range of 0.3 to 0.8 μm. The substrate on which the liquid crystal molecules are vertically aligned may be on the reflection board side or on the transparent electrode side.

In the liquid crystal cell of GH mode, the liquid crystal layer comprises liquid crystal and a dichromatic dye. If both of the liquid crystal and the dichromatic dye are rod-like compounds, the director of liquid crystal is parallel to the long axis of the dichromatic dye molecule. Accordingly, when voltage is applied to change alignment of the liquid crystal, the alignment of dichromatic dye is changed at the same time. There are some types of liquid crystal cell of GH mode. Examples of the type include Heilmeir type, white-Taylor type (in which cholesteric liquid crystal is used), dual-layered type and a type in which a λ/4 plate is used. In the invention, the type in which a λ/4 plate is used is preferred. The guest-host liquid crystal display of reflection type comprising a λ/4 plate is described in Japanese Patent Provisional Publication Nos. 6 (1994)-222350, 8 (1996)-36174, 10 (1998)-268300, 10 (1998)-292175, 10 (1998)-293301, 10 (1998)-311976, 10 (1998)-319442, 10 (1998)-325953, 10(1998)-333138 and 11 (1999)-38410. The λ/4 plate is between the liquid crystal layer and the reflection board. In the liquid crystal layer, the liquid crystal molecules are oriented in vertical alignment preferably to in horizontal alignment. The liquid crystal preferably has a negative dielectric anisotropy.

The liquid crystal display of reflection type may be designed normally white mode (in which a bright or dark image is displayed when the applied voltage is low or high, respectively) or normally black mode (in which a dark or bright image is displayed when the applied voltage is low or high, respectively). The normally white mode is preferred.

Example 1

Preparation of Cellulose Ester Film

At room temperature, 120 weight parts of cellulose acetate (average acetic acid content: 59.7%), 2.4 weight parts of an additive (10-trans), 9.36 weight parts of triphenyl phosphate, 4.68 weight parts of biphenyldiphenyl phosphate, 2.4 weight parts of tribenzylamine, 718 weight parts of methylene chloride, and 62.4 weight parts of methanol were mixed to prepare a solution (dope).

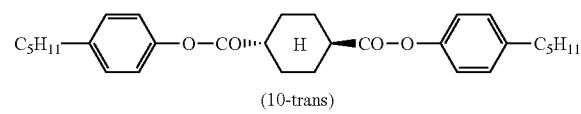

(10-trans)

The prepared dope was cast on a glass plate, dried at room temperature for 1 minute, and further dried at 45° C. for 5 minutes. After peeled from the plate, the formed film was dried at 100° C. for 30 minutes and then further dried at 130° C. for 20 minutes. The amount of the solvent remaining in the obtained film was 0.5 wt. %.

After sized for a proper size, the film was stretched at 130° C. parallel to the casting direction to be 1.33 times as long as the original length. In stretching the film, the film was let to shrink freely perpendicularly to the stretching direction. The stretched film was then cooled to room temperature. In the thus-treated film, the solvent remained in the amount of 0.1 wt. %. The thickness of the obtained film was 102 μm. The ratio of stretching (SA/SB) was 1.48.

The Re retardation values of the prepared cellulose ester film (phase retarder) were measured at 450 nm, 550 nm and 590 nm by means of an ellipsometer (M-150, JASCO CORPORATION), and found 111.6 nm, 137.3 nm and 145.2 nm, respectively.

Further, the refractive index was measured by means of an Abbe's refractometer and also the angular dependence of retardation was measured at 550 nm, to determine the refractive index (nx) in the direction parallel to the slow axis in the plane, the refractive index (ny) in the direction perpendicular to the slow axis in the plane, and the refractive index (nz) in the thickness direction. From the obtained refractive indexes at 550 nm, the value of (nx−nz)/(nx−ny) was calculated to find 1.50.

(Preparation of Liquid Crystal Display of Reflection Type)

A polarizing plate and a phase retarder were removed from a commercially available liquid crystal display of reflection type (Color Zaurus MI-310, Sharp Corporation). In place of the removed members, the polarizing plate and the phase retarder prepared above (polarizing plate laminated with a protective film having AR-treated surface) were installed.

The thus-prepared liquid crystal display of reflection type was observed with the eyes. As a result, it was found that the display gave neutral gray without undesirable color in dark, bright and medium tone images.

Further, the contrast ratio of brightness in reflection was measured by means of a measuring apparatus (EZ-Contrast 160D, ELDIM), and thereby it was found that the front contrast ratio was 20. The viewing angle range giving a contrast ratio of 3 was 120° or more in both vertical (up-downward) and horizontal (left-rightward) direction.

(Spectrum of Additive)

The absorption spectrum of the additive (10-trans) was measured in ultraviolet-visible (UV-vis) wavelength region in the following manner.

The additive (10-trans) was dissolved in tetrahydrofuran (without a stabilizer (BHT)) so that the concentration might be $10^{-5}$ mol/dm$^3$. The absorption spectrum of the thus-prepared solution was measured by means of a spectro-photometer (Hitachi, Ltd.). In the obtained absorption spectrum, the maximum absorption peak was given at 220 nm (λmax) and the absorption coefficient (∈) at the peak was 15,000.

Comparison Example 1

The procedure of Example 1 was repeated except for using 1.2 weight parts of the following additive (Ref-1) in place of 10-trans, to prepare a cellulose ester film (phase retarder) and a liquid crystal display of reflection type.

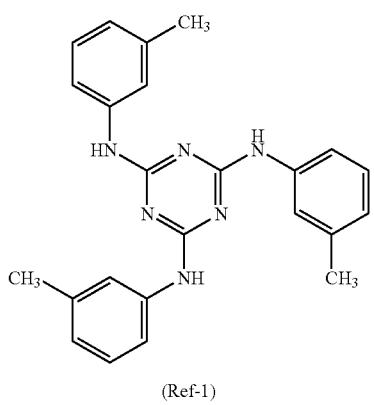

(Ref-1)

(Evaluation of Phase Retarder)

The Re retardation values of the prepared cellulose ester film (phase retarder) were measured at 450 nm, 550 nm and 590 nm by means of an ellipsometer (M-150, JASCO CORPORATION), and found 109.4 nm, 125.3 nm and 130.2 nm, respectively.

Further, the refractive index was measured by means of an Abbe's refractometer and also the angular dependence of retardation was measured at 550 nm, to determine the refractive index (nx) in the direction parallel to the slow axis in the plane, the refractive index (ny) in the direction perpendicular to the slow axis in the plane, and the refractive index (nz) in the thickness direction. From the obtained refractive indexes at 550 nm, the value of (nx−nz)/(nx−ny) was calculated to find 1.90.

(Evaluation of Liquid Crystal Display of Reflection Type)

The thus-prepared liquid crystal display of reflection type was observed with the eyes. As a result, it was found that the display gave yellowish, bluish and other undesirable color in dark, bright and medium tone images, respectively. In all the displayed images, the display could not give neutral gray.

(Spectrum of Additive)

The absorption spectrum of the additive (Ref-1) was measured in ultraviolet-visible (UV-vis) wavelength region in the following manner.

The additive (Ref-1) was dissolved in tetrahydrofuran (without a stabilizer (BHT)) so that the concentration might be $10^{-5}$ mol/dm$^3$. The absorption spectrum of the thus-prepared solution was measured by means of a spectro-photometer (Hitachi, Ltd.). In the obtained absorption spectrum, the maximum absorption peak was given at 280 nm (λmax) and the absorption coefficient at the peak was 60,000.

Example 2

The procedure of Example 1 was repeated except for using another additive (23-trans) in place of 10-trans in the amount shown in Table 1, to prepare a cellulose ester film (phase retarder). The retardation of the film was measured, and the result was set forth in Table 1.

Example 3

The procedure of Example 1 was repeated except for using another additive (29-trans) in place of 10-trans in the amount shown in Table 1, to prepare a cellulose ester film (phase retarder). The retardation of the film was measured, and the result was set forth in Table 1.

Comparison Example 2

The procedure, of Example 1 was repeated except for using another additive (Ref-1) in place of 10-trans in the amount shown in Table 1, to prepare a cellulose ester film (phase retarder). The retardation of the film was measured, and the result was set forth in Table 1.

Comparison Example 3

The procedure of Example 1 was repeated except for using another additive (Ref-2) in place of 10-trans in the amount shown in Table 1, to prepare a cellulose ester film (phase retarder). The retardation of the film was measured, and the result was set forth in Table 1.

TABLE 1

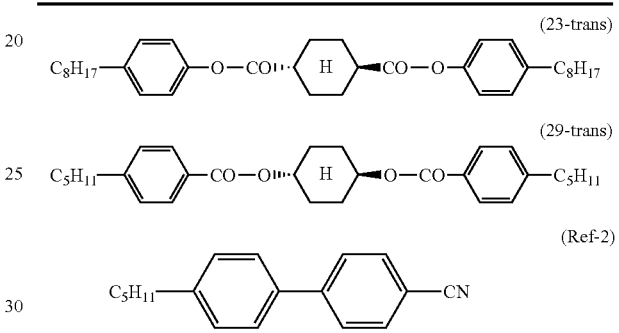

(23-trans)

(29-trans)

(Ref-2)

| Film | Additive | Amount of additive (weight parts) | Wavelength of absorption maximum (λmax) | Absorption coefficient (ε) at absorption maximum |
|---|---|---|---|---|
| Example 1 | 10-trans | 1.8 | 220 nm | 15,000 |
| Example 2 | 23-trans | 2.3 | 230 nm | 16,000 |
| Example 3 | 29-trans | 2.0 | 240 nm | 20,000 |
| Comp. Ex. 1 | Ref-1 | 1.2 | 280 nm | 60,000 |
| Comp. Ex. 2 | Ref-1 | 1.8 | 280 nm | 60,000 |
| Comp. Ex. 3 | Ref-2 | 1.6 | 280 nm | 60,000 |

| Film | Retardation | | | Coloring* |
| | 450 nm | 550 nm | 590 nm | |
|---|---|---|---|---|
| Example 1 | 111.6 nm | 137.3 nm | 146.2 nm | A |
| Example 2 | 112.6 nm | 137.5 nm | 144.2 nm | A |
| Example 3 | 113.6 nm | 137.6 nm | 143.1 nm | A |
| Comp. Example 1 | 109.4 nm | 125.3 nm | 130.2 nm | C |
| Comp. Example 2 | 120.6 nm | 137.2 nm | 140.2 nm | B |
| Comp. Example 3 | 122.4 nm | 137.1 nm | 141.0 nm | B |
| Theoretical λ/4 | 112.5 nm | 137.5 nm | 147.5 nm | |

Remarks: (coloring*)
A: undesirable colors are observed in neither dark, bright nor medium tone images;
B: bluish and yellowish undesirable colors are observed in bright and dark images, respectively; and
C: undesirable colors are observed in dark, bright and medium tone images, and all the images exhibited low contrast.

[Auxiliary Experiment]

(Spectrum of Retardation-Increasing Agent)

The absorption spectra of the retardation-increasing agents (10-trans), (41-trans) and (29-trans) were measured in ultraviolet-visible (UV-vis) wavelength region.

Each agent was dissolved in tetrahydrofuran (without a stabilizer (BHT)) so that the concentration might be $10^{-5}$ mol/dm$^3$. The absorption spectrum of the thus-prepared solution was measured by means of a spectro-photometer (Hitachi, Ltd.). The results were set forth in Table 2.

TABLE 2

(10-trans)

C₅H₁₁—⟨phenyl⟩—O—CO⋯⟨H⟩—CO—O—⟨phenyl⟩—C₅H₁₁

(41-trans)

C₇H₁₅—⟨phenyl⟩—O—CO⋯⟨H⟩—CO—O—⟨phenyl⟩—C₇H₁₅

(29-trans)

C₅H₁₁—⟨phenyl⟩—CO—O⋯⟨H⟩—O—CO—⟨phenyl⟩—C₅H₁₁

| Retardation increasing agent | Wavelength of absorption maximum (λmax) | Absorption coefficient (ε) at absorption maximum |
|---|---|---|
| 10-trans | 220 nm | 15,000 |
| 41-trans | 230 nm | 16,000 |
| 29-trans | 240 nm | 20,000 |

Example 4

Preparation of Polymer Film

At room temperature, 100 weight parts of cellulose acetate (average acetic acid content: 59.5%), 7.8 weight parts of triphenyl phosphate, 3.9 weight parts of biphenyldiphenyl phosphate, 1.32 weight parts of a retardation-increasing agent (41-trans), 587.69 weight parts of methylene chloride, and 50.85 weight parts of methanol were mixed to prepare a solution (dope).

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose acetate film was further dried at 120° C. for 10 minutes. The film was then stretched at 130° C. parallel to the casting direction while let freely shrink perpendicularly, to be 1.34 times as long as the original length. The stretched film was furthermore dried at 120° C. for 30 minutes, to prepare a cellulose acetate film in which the solvent remained in the amount of 0.1 wt. %.

The thus-prepared polymer film (PF-1) had the thickness of 112.7 μm, and its retardation values were measured at 450 nm, 550 nm and 590 mm by means of an ellipsometer (M-150, JASCO CORPORATION) to find 125.2 nm, 137.8 nm and 141.1 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.48.

Example 5

Preparation of Polymer Film

At room temperature, 100 weight parts of cellulose acetate (average acetic acid content: 59.5%), 2.35 weight parts of a retardation-increasing agent (10-trans), 7.8 weight parts of triphenyl phosphate, 3.9 weight parts of biphenyldiphenyl phosphate, 594.61 weight parts of methylene chloride, and 52.14 weight parts of methanol were mixed to prepare a solution (dope).

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose acetate film was further dried at 120° C. for 5 minutes. The film was then stretched at 130° C. parallel to the casting direction while let freely shrink perpendicularly, to be 1.3 times as long as the original length. The stretched film was furthermore dried at 130° C. for 20 minutes, to prepare a cellulose acetate film in which the solvent remained in the amount of 0.1 wt. %.

The thus-prepared polymer film (PF-2) had the thickness of 100.1 μm, and its retardation values were measured at 450 nm, 550 nm and 590 nm by means of an ellipsometer (M-150, JASCO CORPORATION) to find 130.1 nm, 141.0 nm and 143.8 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.47.

Example 6

Preparation of Polymer Film

At room temperature, 100 weight parts of cellulose acetate (average acetic acid content: 60.9%), 2.25 weight parts of the retardation-increasing agent (41-trans) used in Example 4, 7.8 weight parts of triphenyl phosphate, 3.9 weight parts of biphenyldiphenyl phosphate, 594.02 weight parts of methylene chloride, and 51.49 weight parts of methanol were mixed to prepare a solution (dope).

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose acetate film was further dried at 120° C. for 5 minutes. The film was then stretched at 130° C. parallel to the casting direction while let freely shrink perpendicularly, to be 1.34 times as long as the original length. The stretched film was furthermore dried at 130° C. for 20 minutes, to prepare a cellulose acetate film in which the solvent remained in the amount of 0.1 wt. %.

The thus-prepared polymer film (PF-3) had the thickness of 119.5 μm, and its retardation values were measured at 450 nm, 550 nm and 590 nm by means of an ellipsometer (M-150, JASCO CORPORATION) to find 127.1 nm, 140.1 nm and 143.5 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.32.

Example 7

Preparation of Polymer Film

In a mixing tank, 100 weight parts of cellulose acetate (average acetic acid content: 61.5%), 7.8 weight parts of triphenyl phosphate, 3.9 weight parts of biphenyldiphenyl phosphate, 594.02 weight parts of methylene chloride, and 51.49 weight parts of methanol were mixed while heated to be dissolved, to prepare a cellulose acetate solution.

In another mixing tank, 2.25 weight parts of the retardation-increasing agent (41-trans) used in Example 4, 16.0 weight parts of methylene chloride and 1.39 weight parts of methanol were placed, heated and stirred to be dissolved. Thus, a retardation-increasing agent solution was prepared.

The prepared cellulose acetate solution and the retardation-increasing agent solution were all mixed and stirred well to prepare a dope.

The prepared dope was cast onto a band-casting machine having a drying zone and a stretching zone equipped with multi-step rolls, by which the formed film was monoaxially stretched. Immediately before entering the stretching zone, the formed film contained the solvent remaining in the amount of 2.0 wt. %. In order to keep a constant temperature, the stretching zone was covered with a casing. The temperature of film surface was kept at 130° C. The temperature in stretching the film was controlled with the rolls and infrared heaters placed among the rolls. The rotation of the rolls was controlled so that the film might be stretched 1.31 times as long as the original length. The thus-stretched film was gradually cooled to room temperature.

The prepared film had the thickness of 145 μm, and contained the solvent remaining in the amount of 0.2 wt. %.

The retardation values of the film were measured at 450 nm, 550 nm and 590 nm by means of an ellipsometer (M-150, JASCO CORPORATION) to find 126.8 nm, 137.8 nm and 140.74 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.47.

Comparison Example 4

Preparation of λ/4 Plate

Polycarbonate (weight average molecular weight: 100,000) was dissolved in methylene chloride to prepare a 17 wt. % solution. The solution was cast onto a glass plate to form a film (dry thickness: 80 μm), which was dried at room temperature for 30 minutes. After further dried at 70° C. for 30 minutes, the polycarbonate film (volatile content: approx. 1 wt. %) was peeled from the glass plate and sized to 5 cm×10 cm. The sized film was monoaxially stretched at 158° C. to obtain a stretched birefringencial film of polycarbonate.

The retardation values of the obtained polycarbonate film (λ/4 plate) were measured at 450 nm, 550 nm and 590 nm by means of an ellipsometer (M-150, JASCO CORPORATION) to find 147.8 nm, 137.5 nm and 134.9 nm, respectively.

Example 8

Preparation of Polarizing Membrane

Polyvinyl alcohol (average polymerization degree: 4,000; saponification degree: 99.8 mol. %) was dissolved in water to prepare a 4.0% aqueous solution. The solution was cast onto a band and dried to form a film. After peeled from the band, the film was stretched parallel to the casting direction under dry condition and then immersed in an aqueous solution containing 0.5 g/l of iodine and 50 g/l of potassium iodide at 30° C. for 1 minute. Immediately after that, the film was again immersed in another aqueous solution containing 100 g/l of boric acid and 60 g/l of potassium iodide at 70° C. for 5 minutes. The film was washed with water in a tank at 20° C. for 10 seconds, and then dried at 80° C. for 5 minutes. Thus, a polarizing membrane in the shape of a long band film (CHM-1, width: 1,290 mm; thickness: 20 μm) was prepared.
(Preparation of Circularly Polarizing Plate)

The cellulose acetate film prepared in Example 6 and a commercially available polarizing plate (SANRITZ CORPORATION) were laminated with an adhesive, so that the slow axis of the film might be at the angle of 45° to the transmission axis of the plate. Thus, a circularly polarizing plate was produced.

The produced circularly polarizing plate gave almost completely circularly polarized light in a wide wavelength region (450 to 590 nm).

Example 9

Preparation of Polarizing Membrane

Polyvinyl alcohol (average polymerization degree: 4,000; saponification degree: 99.8 mol. %) was dissolved in water to prepare a 4.0% aqueous solution. The solution was cast onto a band and dried to form a film. After peeled from the band, the film was stretched parallel to the casting direction under dry condition and then immersed in an aqueous solution containing 0.5 g/l of iodine and 50 g/l of potassium iodide at 30° C. for 1 minute. Immediately after that, the film was again immersed in another aqueous solution containing 100 g/l of boric acid and 60 g/l of potassium iodide at 70° C. for 5 minutes. The film was washed with water in a tank at 20° C. for 10 seconds, and then dried at 80° C. for 5 minutes. Thus, a polarizing membrane in the shape of a long band film (CHM-1, width: 1,290 mm; thickness: 20 μm) was prepared.
(Preparation of Circularly Polarizing Plate)

The cellulose acetate film prepared in Example 6, the polarizing plate prepared above and a commercially available cellulose acetate film (Fujitac, Fuji Photo Film Co., Ltd.) were roll-to-roll laminated and layered in this order. Thus, a circularly polarizing plate was produced.

The produced circularly polarizing plate gave almost completely circularly polarized light in a wide wavelength region (450 to 590 nm).

Example 10

Preparation of TN-Mode Liquid Crystal Display of Reflection Type

A glass substrate having an ITO electrode and another glass substrate equipped with an aluminum reflective electrode having a finely roughed surface were prepared. On the electrode of each glass substrate, a polyimide orientation layer (SE-7992, Nissan Chemical Industries Ltd.) was formed and subjected to rubbing treatment. The substrates were laminated so that the orientation layers might face to each other, and a spacer of 3.4 μm was inserted between the substrates. The substrates were placed so that the rubbing directions of the orientation layers might be crossed at the angle of 110°. To the gap between the substrates, a liquid crystal compound (MLC-6252, Merck) was injected to form a liquid crystal layer. Thus, a liquid crystal cell of TN mode (twisted angle: 70°, Δnd: 269 nm) was produced.

The circularly polarizing plate (polarizing membrane on which a protective film having AR-treated surface was laminated) prepared in Example 8 was laminated on the glass substrate having the ITO electrode, so that the cellulose acetate film of the plate might be in contact with the glass substrate. Thus, a liquid crystal display of reflection type was prepared.

To the thus-prepared display of reflection type, voltage of a square wave 1 kHz was applied. The display was then observed with eyes, and thereby it was confirmed that an image of neutral gray was given without undesirable coloring in both white mode (1.5 V) and black mode (4.5 V).

The contrast ratio of reflection brightness was measured by means of a meter (EZ-Contrast 160D, ELDIM), and thereby it was found that the front contrast ratio was 25 and that the viewing angle giving the contrast ratio of 3 was not less than 120° (up-downward) or not less than 120° (left-rightward). Further, the display was subjected to the durability test (temperature: 60° C., relative humidity: 90%) for 500 hours, but even so the displayed image had no defect.

Example 11

Preparation of STN-Mode Liquid Crystal Display of Reflection Type

A glass substrate having an ITO transparent electrode and another glass substrate having a smooth aluminum reflective electrode were prepared. On the electrode of each glass substrate, a polyimide orientation layer (SE-150, Nissan Chemical Industries Ltd.) was formed and subjected to rubbing treatment. The substrates were laminated so that the polyimide orientation layers might face to each other, and a spacer of 6.0 μm was inserted between the substrates. The substrates were placed so that the rubbing directions of the orientation layers might be crossed at the angle of 60°. To the gap between the substrates, a liquid crystal compound (ZLI-2977, Merck) was injected to form a liquid crystal layer. Thus, a liquid crystal cell of STN mode (twisted angle: 240°, Δnd: 791 nm) was produced.

A commercially available internal diffusing sheet (IDS, Dai Nippon Printing Co., Ltd.) and the circularly polarizing plate prepared in Example 8 were laminated in this order with an adhesive on the glass substrate having the ITO transparent electrode, so that the polarizing plate might be the top or bottom.

To the thus-prepared liquid crystal display of reflection type, voltage of a square wave 55 Hz was applied. The display was then observed with eyes, and thereby it was confirmed that an image of neutral gray was given without undesirable coloring in both white mode (2.5 V) and black mode (2.0 V).

The contrast ratio of reflection brightness was measured by means of a meter (EZ-Contrast 160D, ELDIM), and thereby it was found that the front contrast ratio was 8 and that the viewing angle giving the contrast ratio of 3 was 90° (up-downward) or 105° (left-rightward).

Example 12

Preparation of HAN-Mode Liquid Crystal Display of Reflection Type

A glass substrate having an ITO transparent electrode and another glass substrate having a smooth aluminum reflective electrode were prepared. On the ITO transparent electrode, a polyimide orientation layer (SE-610, Nissan Chemical Industries Ltd.) was formed and subjected to rubbing treatment. On the aluminum reflective electrode, a vertical orientation layer (SE-1211, Nissan Chemical Industries Ltd.) was formed and not subjected to rubbing treatment. The substrates were laminated so that the orientation layers might face to each other, and a spacer of 4.0 μm was inserted between the substrates. To the gap between the substrates, a liquid crystal compound (ZLI-1565, Merck) was injected to form a liquid crystal layer. Thus, a liquid crystal cell of HAN mode (Δnd: 519 nm) was produced.

The circularly polarizing plate prepared in Example 8 was laminated with an adhesive on the glass substrate having the ITO transparent electrode, and further thereon a light-diffusing membrane (Lumisty, Sumitomo Chemical Co., Ltd.) was laminated.

To the thus-prepared liquid crystal display of reflection type, voltage of a square wave 55 Hz was applied. The display was then observed with eyes, and thereby it was confirmed that an image of neutral gray was given without undesirable coloring in both white mode (2.0 V) and black mode (0.8 V).

The contrast ratio of reflection brightness was measured by means of a meter (EZ-Contrast 160D, ELDIM), and thereby it was found that the front contrast ratio was 8 and that the viewing angle giving the contrast ratio of 3 was not less than 120° (up-downward) or not less than 120° (left-rightward).

Example 13

Preparation of TN-Mode Liquid Crystal Display of Reflection Type

The above circularly polarizing plate was laminated with an adhesive on the TN-mode liquid crystal cell prepared in Example 9, so that the polycarbonate film of the plate might be on the ITO electrode side and so that the slow axis of the λ/4 plate might be oriented at 45° to the transmission axis of the polarizing membrane.

To the thus-prepared liquid crystal display of reflection type, voltage of a square wave 1 kHz was applied. The display was then observed with eyes, and thereby it was confirmed that images slightly colored in bluish green and violet were given in white mode (1.5 V) and black mode (4.5 V), respectively.

The contrast ratio of reflection brightness was measured by means of a meter (EZ-Contrast 160D, ELDIM), and thereby it was found that the front contrast ratio was 10 and that the viewing angle giving the contrast ratio of 3 was not less than 100° (up-downward) or not less than 80° (left-rightward).

Example 14

Preparation of Polymer Film

At room temperature, 20 weight parts of cellulose triacetate (average acetic acid content: 60.3%, viscosity average polymerization degree: 320, water content: 0.4 wt. %, in the form of powder in which the mean particle size and the standard deviation of the size were 1.5 mm and 0.5 mm, respectively, and 6 wt. % methylene chloride solution of which had the viscosity of 305 mPa·s), 58 weight parts of methyl acetate, 5 weight parts of acetone, 5 weight parts of methanol, 5 weight parts of ethanol, 5 weight parts of butanol, 1.2 weight parts of ditrimethylolpropane tetraacetate (plasticizer), 1.2 weight parts of triphenyl phosphate (plasticizer), 0.2 weight part of 2,4-bis-(n-octylthio)-6-(4-hydroxxy-3,5-di-tert-butylanilino)-1,3,5-triazine (UV absorber), 0.2 weight part of 2-(2'-hydroxy-3',5'-di-tert-butylphenyl)-5-chlorobeztriazole (UV absorber), 0.2 weight part of 2-(2'-hydroxy-3', 5'-di-tert-amylphenyl)-5-chloro-beztriazole (UV absorber), 0.02 weight part of $C_{12}H_{25}OCH_2CH_2O\text{-}P\text{---}(=O)\text{---}(OK)_2$ (releasing agent), 0.02 weight part of citric acid (releasing agent), and 0.05 weight part of silica particles (size: 20 nm, Mohs hardness number: approx. 7) are mixed to prepare a cellulose acetate solution.

The cellulose triacetate used above contained 0.01 wt. % or less of remaining acetic acid, 0.05 wt. % of Ca, 0.007 wt. % of Mg and 5 ppm of Fe. The substitution degree at 6-position was 0.95, and was 32.2% based on the total substitution degree at 2-, 3- and 6-positions. The extract with acetone was 11 wt. %. The ratio of weight and number average molecular weights was 0.5, which indicated the particles were evenly dispersed. The yellowness index, haze, transmittance, Tg and crystallization calorific value were 0.3, 0.08, 93.5%, 160° C. and 6.2 J/g, respectively.

In another mixing tank, 2.25 weight parts of a retardation-increasing agent (41-trans), 16.0 weight parts of methylene chloride and 1.39 weight parts of methanol were placed, heated and stirred to be dissolved. Thus, a retardation-increasing agent solution was prepared.

The prepared cellulose acetate solution and the retardation-increasing agent solution were all mixed and stirred well to prepare a dope.

The prepared dope was cast onto a band-casting machine having a drying zone and a stretching zone equipped with multi-step rolls, by which the formed film was monoaxially stretched. Immediately before entering the stretching zone, the formed film contained the solvent remaining in the amount of 2.0 wt. %. In order to keep a constant temperature, the stretching zone was covered with a casing. The temperature of film surface was kept at 130° C. The temperature in stretching the film was controlled with the rolls and infrared heaters placed among the rolls. The rotation of the rolls was controlled so that the film might be stretched 1.31 times as long as the original length. The thus-stretched film was gradually cooled to room temperature, and wound up.

The prepared film had the thickness of 120.1 μm.

The retardation values of the film were measured at 450 nm, 550 nm and 590 nm by means of an ellipsometer (M-150, JASCO CORPORATION) to find 127.0 nm, 140.3 nm and 144.2 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.48.

Example 15

Preparation of λ/4 Plate

At room temperature, 100 weight parts of cellulose ester (average acetic acid content: 59.5%), 7.8 weight parts of triphenyl phosphate, 3.9 weight parts of biphenyldiphenyl phosphate, 1.32 weight parts of the following retardation-increasing agent (41-trans), 587.69 weight parts of methylene chloride, and 50.85 weight parts of methanol were mixed to prepare a solution (dope).

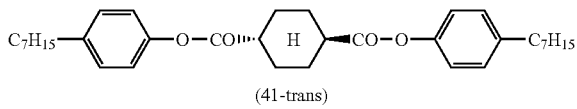

(41-trans)

The prepared dope was cast onto a film-forming band, dried at room temperature for 1 minute, and further dried at 45° C. for 5 minutes. The thus-formed film contained the solvent remaining in the amount of 30 wt. %. After peeled from the band, the formed cellulose ester film was further dried at 120° C. for 10 minutes. The film was then stretched at 130° C. parallel to the casting direction while let freely shrink perpendicularly, to be 1.34 times as long as the original length. The stretched film was furthermore dried at 120° C. for 30 minutes, to prepare a cellulose acetate film in which the solvent remained in the amount of 0.1 wt. %.

The thus-prepared polymer film had the thickness of 113 μm, and its retardation values were measured at 450 nm, 550 nm and 590 nm by means of an ellipsometer (M-150, JASCO CORPORATION) to find 125.2 nm, 137.8 nm and 141.1 nm, respectively. The cellulose ester film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.48.

(Formation of Transparent Electrically Conductive Membrane on λ/4 Plate)

The above-prepared film was set on a sputtering apparatus of wind-up type. After evacuated to 1.2 mPa, the vacuum chamber was filled with a mixed gas of Ar and $O_2$ ($O_2$: 1.5%) at 0.25 Pa. The film was then subjected to DC sputtering (substrate temperature: 25° C., electric power density: 1 W/cm$^2$) to form a transparent electrically conductive membrane of $In_2O_3$ (thickness: 42 nm).

The surface resistance on the formed membrane side of the film was measured according to four-terminal method, to find 206Ω per square. The light transmittance was 88%.

The retardation values (Re) of the thus-prepared film having the membrane were measured at 450 nm, 550 nm and 590 nm by means of an ellipsometer (M-150, JASCO CORPORATION) to find 125.2 nm, 137.8 nm and 141.1 nm, respectively. The cellulose ester film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.48.

(Preparation of Touch Panel)

A glass plate (thickness: 0.7 mm) coated with a transparent electrically conductive membrane of ITO (surface resistance of single surface: 800Ω per square) was prepared. Dot spacers of 1 mm were placed on the surface, and silver electrodes were printed on both ends of the plate. Independently, on both ends of the above-prepared λ/4 plate having the conductive membrane, silver electrodes were also printed. The thus-treated λ/4 plate and the above glass plate were laminated so that the conductive membranes might face to each other, and then a flexible electrode was provided. At the peripheral area of the gap between the laminated substrates, an insulating adhesive was inserted in the thickness of 100 μm. Thus, a touch panel was prepared. On the λ/4 plate side of the touch panel, a polarizing plate having AR treated surface was laminated so that the transmission axis of the polarizing plate might be at the angle of 45° to the stretching direction (parallel to the slow axis) of the λ/4 plate. Thus, a touch panel comprising a λ/4 plate with a transparent electrically conductive membrane was produced.

(Preparation of Liquid Crystal Display of Reflection Type Equipped with Touch Panel)

A touch panel, a polarizing plate and a phase retarder were removed from a commercially available liquid crystal display of reflection type equipped with a touch panel (Power Zaurus MI-C1, Sharp Corporation). In place of the removed members, the touch panel prepared above was installed.

The contrast ratio of the prepared liquid crystal display was measured by means of a measuring apparatus (EZ-Contrast 160D, ELDIM), and thereby it was found that the front contrast ratio was 10:1. The viewing angle range giving a contrast ratio of 2:1 was 120° or more in both vertical (up-downward) and horizontal (left-rightward) directions. It was also found that the display gave neutral gray without undesirable color in both dark and bright images. The surface reflectance was 9.5%, which indicated that the display reflected outer scenes little enough to be excellent in recognizability. Also as an input unit, the display exhibited good performance.

Example 16

Preparation of λ/4 Plate

At room temperature, 20 weight parts of cellulose triacetate (substitution degree: 2.82, viscosity average polymerization degree: 320, water content: 0.4 wt. %, in the form of powder in which the mean particle size and the standard deviation of the size were 1.5 mm and 0.5 mm, respectively, and 6 wt. % methylene chloride solution of which had the viscosity of 305 mPa·s), 58 weight parts of methyl acetate, 5 weight parts of acetone, 5 weight parts of methanol, 5 weight parts of ethanol, 5 weight parts of butanol, 1.2 weight parts of ditrimethylolpropane tetraacetate (plasticizer), 1.2 weight parts of triphenyl phosphate (plasticizer), 1.00 weight part of the retardation-increasing agent (41-trans), 0.02 weight part of $C_{12}H_{25}OCH_2CH_2O-P-(=O)-(OK)_2$ (releasing agent), 0.02 weight part of citric acid (releasing agent), and 0.05 weight part of silica particles (size: 20 nm, Mohs hardness number: approx. 7) are mixed to prepare a cellulose acetate solution.

The cellulose triacetate used above contained 0.01 wt. % or less of remaining acetic acid, 0.05 wt. % of Ca, 0.007 wt. % of Mg and 5 ppm of Fe. The substitution degree at 6-position was 0.95, and was 32.2% based on the total substitution degree at 2-, 3- and 6-positions. The extract with acetone was 11 wt. %. The ratio of weight and number average molecular weights was 0.5, which indicated the particles were evenly dispersed. The yellowness index, haze, transmittance, Tg and crystallization calorific value were 0.3, 0.08, 93.5%, 160° C. and 6.2 J/g, respectively.

The prepared film had the thickness of 121.7 μm.

The retardation values of the film were measured at 450 nm, 550 nm and 590 nm by means of an ellipsometer (M-150, JASCO CORPORATION) to find 126.2 nm, 138.8 nm and 142.1 nm, respectively. The cellulose acetate film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.50.

(Formation of Transparent Electrically Conductive Membrane on λ/4 Plate)

The above-prepared λ/4 plate was subjected to sputtering in the same manner as in Example 15, to form a transparent electrically conductive membrane of $In_2O_3$ (thickness: 50 nm).

The surface resistance on the formed membrane side of the film was measured according to four-terminal method, to find 226Ω per square. The light transmittance was 87%.

The retardation values (Re) of the thus-prepared film having the membrane were measured at 450 nm, 550 nm and 590 nm by means of an ellipsometer (M-150, JASCO CORPORATION) to find 126.2 nm, 138.8 nm and 142.1 nm, respectively. The cellulose ester film, therefore, gave λ/4 in a wide wavelength range.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.50.

(Preparation of Touch Panel)

A glass plate (thickness: 0.7 mm) coated with a transparent electrically conductive membrane of ITO (surface resistance of single surface: 800Ω per square) was prepared. Dot spacers of 1 mm were placed on the surface, and silver electrodes were printed on both ends of the plate. Independently, on both ends of the above-prepared λ/4 plate having the conductive membrane, silver electrodes were also printed. The thus-treated λ/4 plate and the above glass plate were laminated so that the conductive membranes might face to each other, and then a flexible electrode was provided. At the peripheral area of the gap between the laminated substrates, an insulating adhesive was inserted in the thickness of 100 μm. Thus, a touch panel was prepared. On the λ/4 plate side of the touch panel, a polarizing plate having AR treated surface was laminated so that the transmission axis of the polarizing plate might be at the angle of 45° to the stretching direction (parallel to the slow axis) of the λ/4 plate. Thus, a touch panel comprising a λ/4 plate with a transparent electrically conductive membrane was produced.

(Preparation of Liquid Crystal Display of Reflection Type Equipped with Touch Panel)

A touch panel, a polarizing plate and a phase retarder were removed from a commercially available liquid crystal display of reflection type equipped with a touch panel (Power Zaurus MI-C1, Sharp Corporation). In place of the removed members, the touch panel prepared above was installed.

The contrast ratio of the prepared liquid crystal display was measured by means of a measuring apparatus (EZ-Contrast 160D, ELDIM), and thereby it was found that the front contrast ratio was 10:1. The viewing angle range giving a contrast ratio of 2:1 was 120° or more in both vertical (up-downward) and horizontal (left-rightward) directions. It was also found that the display gave neutral gray without undesirable color in both dark and bright images. The surface reflectance was 9.1%, which indicated that the display reflected outer scenes little enough to be excellent in recognizability. Also as an input unit, the display exhibited good performance.

Example 17

Preparation of λ/4 Plate

The procedure of Example 15 was repeated to prepare a λ/4 plate.

(Coating with Transparent Electrically Conductive Membrane)

1) Preparation of Silver Palladium Colloidal Dispersion

Solutions of 30% $Fe^{(II)}SO_4.7H_2O$ and 40% citric acid were prepared and mixed. While the mixed solution was kept at 20° C. and being stirred, another solution containing 10% silver nitrate and palladium nitrate (9/1, by molar ratio) was added at the rate of 200 ml/minute. The resultant solution was repeatedly centrifuged and washed with water, and finally pure water was added so that the colloidal content was 3 wt. %. Thus, a silver palladium colloidal dispersion was prepared. According to TEM observation, it was found that silver colloid particles in the obtained dispersion had sizes in the range of approx. 9 to 12 nm. The ratio between silver and palladium was also measured by ICP to be found 9/1, which was the same as the ratio in the starting material.

2) Preparation of Silver Palladium Colloidal Coating Liquid

To 100 g of the above dispersion, isopropyl alcohol was added and mixed with an ultrasonic disperser. The obtained liquid was filtrated through a polypropylene filter (porosity size: 1 μm) to prepare a coating liquid.

3) Preparation of Coating Liquid (L-1) for Overcoating

In a mixture of 38 g of methyl isopropyl ketone, 38 g of 2-butanol and 19 g of methanol, 2 g of a mixture of dipentaerythritol pentaacrylate and dipentaerythritol hexaacrylate (DPHA, Nippon Kayaku Co., Ltd.), 80 mg of a photopolymerization initiator (Irgacure 907, Ciba-Geigy) and 30 mg of a sensitizer (Kayacure DETX, Nippon Kayaku Co., Ltd.) were added and dissolved. After stirred for 30 minutes, the obtained mixture was filtrated through a polypropylene filter (porosity size: 1 μm) to prepare a coating liquid for overcoating.

4) Formation of Transparent Electrically Conductive Layer

The λ/4 plate was subjected to the corona discharge treatment, and then coated with the above-prepared silver palladium colloidal coating liquid by means of a wire bar in the amount of 70 mg/m². The applied liquid was dried at 40° C., and then sprayed with water supplied by a pump. After excess water was removed with an air-knife, the plate was transferred through a heating zone at 120° C. for 5 minutes. The coating liquid (L-1) for overcoating was then applied, dried, treated at 120° C. for 2 hours, and exposed to ultraviolet light to harden the formed layer (thickness: 80 nm).

The surface resistance on the formed conductive layer side of the plate was measured according to four-terminal method, to find 200Ω per square. The light transmittance was 71%.

(Preparation of Touch Panel)

A glass plate (thickness: 0.7 mm) in which one surface had the surface resistance of 5Ω per square and the other surface was coated with a transparent electrically conductive membrane of ITO (surface resistance: 400Ω per square) was prepared. On the surface having the surface resistance of 5Ω per square, a polyimide orientation layer (SE-7992, Nissan Chemical Industries Ltd.) was formed and subjected to rubbing treatment. On the other surface (surface resistance: 400Ω per square), dot spacers of 1 mm were placed and silver electrodes were printed on both ends. Independently, on both ends of the above-prepared λ/4 plate having the conductive membrane, silver electrodes were also printed. The thus-treated λ/4 plate and the above glass plate were laminated so that the conductive membranes might face to each other. At the peripheral area of the gap between the laminated substrates, an insulating adhesive was inserted in the thickness of 100 μm. Thus, a touch panel was prepared. On the λ/4 plate side of the touch panel, a polarizing plate having AR treated surface was laminated so that the transmission axis of the polarizing plate might be at the angle of 45° to the stretching direction (parallel to the slow axis) of the λ/4 plate. Thus, a touch panel was produced.

(Preparation of Liquid Crystal Display of Reflection Type)

A glass substrate equipped with an aluminum reflective electrode having a finely roughed surface was prepared. On the electrode of the glass substrate, a polyimide orientation layer (SE-7992, Nissan Chemical Industries Ltd.) was formed and subjected to rubbing treatment. The substrate and the above touch panel were laminated so that the orientation layers might face to each other, and a spacer of 3.4 μm was inserted into a gap between them. The substrate and the touch panel were placed so that the rubbing directions of the orientation layers might be crossed at the angle of 110°. To the gap, a liquid crystal compound (MLC-6252, Merck) was injected to form a liquid crystal layer. Thus, a liquid crystal cell of TN mode (twisted angle: 70°, Δnd: 269 nm) was produced. Thus, a liquid crystal display of reflection type equipped with a touch panel was prepared.

To the thus-prepared display of reflection type, voltage of a square wave 1 kHz was applied. The display was then observed with eyes, and thereby it was confirmed that an image of neutral gray was given without undesirable coloring in both white mode (1.5 V) and black mode (4.5 V).

The contrast ratio of reflection brightness was measured by means of a meter (EZ-Contrast 160D, ELDIM), and thereby it was found that the front contrast ratio was 25 and that the viewing angle giving the contrast ratio of 2 was not less than 120° (up-downward) or not less than 120° (left-rightward).

It was also confirmed that the touch panel worked without any trouble. The surface reflectance was 8.9%, which indicated that the display reflected outer scenes little enough to be excellent in recognizability.

Comparison Example 5

Preparation of λ/4 Plate

At room temperature, 120 weight parts of cellulose acetate (average acetic acid content: 59.7%), 1.2 weight parts of the following retardation-increasing agent, 9.36 weight parts of triphenylene phosphate, 4.68 weight parts of biphenyldiphenyl phosphate, 2.0 weight parts of tribenzylamine, 538.2 weight parts of methylene chloride, and 46.8 weight parts of methanol were mixed to prepare a solution (dope).

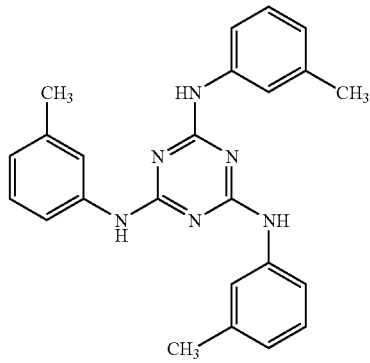

(Retardation-increasing agent)

The prepared dope was cast onto a band made of stainless steel, and dried to let the formed film self-supporting. The thus-formed film contained a volatile content in the amount of 30 wt. %. After peeled from the band, the film was further dried at 120° C. for 15 minutes to reduce the volatile content to 2 wt. % or less. The film was then stretched at 130° C. parallel to the casting direction while let freely shrink perpendicularly. The stretched film was dried at 120° C. for 30 minutes, to prepare a cellulose acetate film in which the solvent remained in the amount of 0.1 wt. %.

The thus-prepared polymer film (λ/4 plate) had the thickness of 112 μm, and its retardation values were measured at 450 nm, 550 nm and 590 nm by means of an ellipsometer (M-150, JASCO CORPORATION) to find 71.3 nm, 78.1 nm and 80.0 nm, respectively.

Further, the refractive indexes were measured with an Abbe's refractometer, and the angle dependence of retardation was also measured. From the obtained data, nx (refractive index along the show axis), ny (refractive index perpendicular to the slow axis) and nz (refractive index along the depth) were determined at 550 nm to find that (nx−nz)/(nx−ny) was 1.50.

(Formation of Transparent Electrically Conductive Membrane on λ/4 Plate)

The above-prepared λ/4 plate was subjected to sputtering in the same manner as in Example 15, to form a transparent electrically conductive membrane of $In_2O_3$ (thickness: 40 nm).

The surface resistance on the formed membrane side of the film was measured according to four-terminal method, to find 204Ω per square. The light transmittance was 85%.

(Preparation of Touch Panel)

A glass plate (thickness: 0.7 mm) coated with a transparent electrically conductive membrane of ITO (surface resistance of single surface: 800Ω per square) was prepared. Dot spacers of 1 mm were placed on the surface, and silver electrodes were printed on both ends of the plate. Independently, on both ends of the above-prepared λ/4 plate having the conductive membrane, silver electrodes were also printed. The thus-treated λ/4 plate and the above glass plate were laminated so that the conductive membranes might face to each other, and then a flexible electrode was provided. At the peripheral area of the gap between the laminated substrates, an insulating adhesive was inserted in the thickness of 100 μm. Thus, a touch panel was prepared. On the λ/4 plate side of the touch panel, a polarizing plate having AR treated surface was laminated so that the transmission axis of the polarizing plate might be at the angle of 45° to the stretching direction (parallel to the slow axis) of the λ/4 plate. Thus, a touch panel comprising a λ/4 plate with a transparent electrically conductive membrane was produced.

(Preparation of Liquid Crystal Display of Reflection Type Equipped with Touch Panel)

A touch panel, a polarizing plate and a phase retarder were removed from a commercially available liquid crystal display of reflection type equipped with a touch panel (Power Zaurus MI-C1, Sharp Corporation). In place of the removed members, the touch panel prepared above was installed.

The contrast ratio of the prepared liquid crystal display was measured by means of a measuring apparatus (EZ-Contrast 160D, ELDIM), and thereby it was found that the front contrast ratio was 5:1. The viewing angle range giving a contrast ratio of 2:1 was approx. 60° in both vertical (up-downward) and horizontal (left-rightward) directions. It was also found that the display gave undesirable bluish and reddish colors in bright and dark images, respectively. The touch panel worked without any trouble. However, the surface reflectance was 19.1%, which indicated that the display considerably reflected outer scenes. Accordingly, the prepared display had poorer recognizability than those prepared in Examples.

The invention claimed is:

1. A phase difference plate comprising a cellulose ester film which comprises a compound represented by the following formula (I):

$$Ar^1-L^1-Ar^2 \qquad (I)$$

in which each of $Ar^1$ and $Ar^2$ is independently phenyl or phenyl substituted with an alkyl group selected from the group consisting of methyl, ethyl, propyl, butyl, pentyl, heptyl and octyl; and $L^1$ is —O—CO-alkylene-CO—O— or —CO—O-alkylene-O—CO—, said alkylene having a chain structure and having 1 to 6 carbon atoms.

2. The phase difference plate as defined in claim 1, wherein the compound represented by the formula (I) exhibits a maximum absorption wavelength (λmax) of shorter than 250 nm in an ultraviolet absorption spectrum measured in a form of a solution of the compound.

3. The phase difference plate as defined in claim 1, wherein the cellulose ester film comprises the compound represented by the formula (I) in an amount of 0.1 to 30 wt. % based on the amount of cellulose ester contained in the cellulose ester film.

4. A cellulose ester film comprising a compound represented by the following formula (I):

$$Ar^1-L^1-Ar^2 \qquad (I)$$

in which each of $Ar^1$ and $Ar^2$ is independently phenyl or phenyl substituted with an alkyl group selected from the group consisting of methyl, ethyl, propyl, butyl, pentyl, heptyl and octyl; and $L^1$ is —O—CO-alkylene-CO—O— or —CO—O-alkylene-O—CO—, said alkylene having a chain structure and having 1 to 6 carbon atoms.

* * * * *